United States Patent
Knauss et al.

(10) Patent No.: US 11,304,284 B2
(45) Date of Patent: Apr. 12, 2022

(54) LAMP SYNCHRONIZATION AFTER EXCESSIVE USER INTERACTION

(71) Applicant: Lutron Technology Company LLC, Coopersburg, PA (US)

(72) Inventors: Matthew Knauss, Somerville, MA (US); Michael W. Pessina, Allentown, PA (US); Matthew J. Swatsky, Allentown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/875,890

(22) Filed: May 15, 2020

(65) Prior Publication Data

US 2020/0367347 A1 Nov. 19, 2020

Related U.S. Application Data

(60) Provisional application No. 62/849,597, filed on May 17, 2019.

(51) Int. Cl.
*H05B 47/19* (2020.01)
*H05B 47/16* (2020.01)
(Continued)

(52) U.S. Cl.
CPC ............ *H05B 47/19* (2020.01); *G08C 17/02* (2013.01); *H05B 47/16* (2020.01); *G05G 1/082* (2013.01); *G05G 1/10* (2013.01); *G08C 2201/30* (2013.01)

(58) Field of Classification Search
CPC ...... H05B 47/115; H05B 47/11; H05B 31/50; H05B 47/105; H05B 47/16; H05B 47/19; H05B 47/10; H05B 47/175; H05B 47/165; H05B 47/17; H05B 45/20; H05B 45/24; H05B 47/155
See application file for complete search history.

(56) References Cited

U.S. PATENT DOCUMENTS

| 5,264,761 A | 11/1993 | Johnson |
| 7,834,856 B2 | 11/2010 | Grinshpoon et al. |

(Continued)

FOREIGN PATENT DOCUMENTS

| CN | 2596671 Y | 12/2003 |
| KR | 20180026161 A | 3/2018 |
| WO | 2015184530 A1 | 12/2015 |

*Primary Examiner* — Monica C King
(74) *Attorney, Agent, or Firm* — Flaster Greenberg, P.C.

(57) ABSTRACT

A remote control device for controlling lighting devices may be configured to detect an excessive user interaction (e.g., a continued user interaction) and reduce a number of command messages that are being transmitted to prevent the lighting devices from producing undesirable visual effects. The remote control device may comprise a user interface (e.g., that may include a rotation portion, such as a rotary knob) and a processor configured to receive an indication of a user interaction via the user interface. The processor may periodically transmit command messages at a transmission frequency in response to a continued user interaction, where each of the command messages comprise a respective command for adjusting to a respective lighting level. The processor may also start a usage timer in response to receiving the indication of the user interaction, and decrease the transmission frequency in response to the usage timer exceeding a usage threshold.

51 Claims, 11 Drawing Sheets

(51) Int. Cl.
   *G08C 17/02* (2006.01)
   *G05G 1/08* (2006.01)
   *G05G 1/10* (2006.01)

(56) References Cited

U.S. PATENT DOCUMENTS

| | | |
|---|---|---|
| 8,009,042 B2 | 8/2011 | Steiner et al. |
| 8,330,638 B2 | 12/2012 | Altonen et al. |
| 8,451,116 B2 | 5/2013 | Steiner et al. |
| 8,471,779 B2 | 6/2013 | Mosebrook |
| 8,950,461 B2 | 2/2015 | Adams et al. |
| 9,115,537 B2 | 8/2015 | Blair |
| 9,208,965 B2 | 12/2015 | Busby et al. |
| 9,368,025 B2 | 6/2016 | Carmen, Jr. |
| 9,418,802 B2 | 8/2016 | Romano et al. |
| 9,520,247 B1 | 12/2016 | Finnegan et al. |
| 9,583,288 B2 | 2/2017 | Jones et al. |
| 9,799,469 B2 | 10/2017 | Bailey et al. |
| 9,959,997 B2 | 5/2018 | Bailey et al. |
| 10,027,127 B2 | 7/2018 | Crafts et al. |
| 10,219,359 B2 | 2/2019 | Harte et al. |
| 10,271,407 B2 | 4/2019 | Pessina et al. |
| 2008/0111491 A1 | 5/2008 | Spira |
| 2012/0292174 A1 | 11/2012 | Mah et al. |
| 2015/0077021 A1 | 3/2015 | Smith et al. |
| 2015/0371534 A1 | 12/2015 | Dimberg et al. |
| 2016/0073479 A1 | 3/2016 | Erchak et al. |
| 2017/0105176 A1 | 4/2017 | Finnegan et al. |
| 2018/0116039 A1 | 4/2018 | Harte et al. |
| 2018/0190451 A1 | 7/2018 | Scruggs |

LAMP SYNCHRONIZATION AFTER EXCESSIVE USER INTERACTION

CROSS-REFERENCE TO RELATED APPLICATIONS

This application claims priority from U.S. Provisional Patent Application No. 62/849,597, filed May 17, 2019, which is hereby incorporated by reference in its entirety.

BACKGROUND

A user environment, such as a residence or an office building, for example, may be configured using various types of load control systems. A lighting control system may be used to control the lighting loads in a user environment. The lighting control system may include various devices, such as input devices and load control devices, capable of communicating via radio frequency (RF) communications. For example, a remote control device may be used to communicate with lighting devices (e.g., light bulbs) in the load control system to adjust the lighting level (e.g., dim the intensity) of the lighting devices.

Lighting devices in the user environment may be collectively controlled by a common lighting control device that is capable of dimming the group of lighting devices and/or toggling the group of lighting devices on and off. Multiple lighting devices in the system may be independently controlled by another lighting control device. Control of the lighting devices may be based on a user interaction at the lighting control device. The user interaction may span a period of time, over which the lighting control device may transmit multiple wireless signals. The wireless signals may include a command to control the lighting devices. As the signals are transmitted wirelessly, observed dimming performance may be negatively impacted by inherent latency due to the RF protocol used to communicate the wireless signals. Further, the lighting devices may become out of sync with one another and/or may not be controlled in a uniform manner. As a result, it may appear to a user that the lighting control device is not functioning properly (e.g., the lighting device is unable to control the lighting devices) and may result in a poor user experience.

SUMMARY

As disclosed herein, a remote control device for controlling lighting devices may be configured to detect a continued and/or excessive user interaction and reduce the number of command messages that are transmitted to prevent the lighting devices from producing undesirable visual effects. The remote control device may comprise a user interface and a processor configured to receive an indication of a user interaction via the user interface. The processor may periodically transmit command messages at a transmission frequency in response to a continued user interaction, where each of the command messages comprise a respective command for adjusting to a respective lighting level. The processor may start a usage timer in response to receiving the indication of the user interaction, and decrease the transmission frequency in response to the usage timer exceeding a usage threshold. For example, the user interface may comprise a rotation portion (e.g., a rotary knob) for receiving user inputs for raising and lowering a lighting level of the lighting devices (e.g., rotation of the rotation portion). The processor may illuminate a visual indicator of the user interface when the usage timer exceeds the usage threshold to indicate to the user that the remote control device has entered a reduced transmission state.

The processor may monitor usage of the rotation portion when the usage timer exceeds the usage threshold to determine if the transmission frequency should be decreased. The remote control device may measure an angular velocity of the rotation portion (e.g., angular distance of rotation over time) when the usage timer exceeds the usage threshold. For example, the remote control device may determine to decrease the transmission frequency if the angular velocity exceeds an angular velocity threshold. Also or alternatively, when the usage timer exceeds the usage threshold the remote control device may determine to decrease the transmission frequency if the change in the angular position of the rotation portion exceeds an angular position change threshold. The remote control device may determine a desired amount of change in a lighting level in response to the determined amount of change in the angular position of the rotation portion. The remote control device may determine to decrease the transmission frequency when the usage timer exceeds the usage threshold if, for example, the desired amount of change in the lighting level exceeds a lighting level change threshold.

The processor may be configured to decrease the transmission frequency by increasing the transmission interval from an initial value to an adjusted value (e.g., an increased transmission interval). For example, the adjusted value may be three to four times the initial value. The processor may be configured to decrease the transmission frequency to zero Hertz (e.g., such that the remote control device stops transmitting command messages). If the remote control device stops transmitting command messages, the remote control device may transmit a final command message in response to the processor detecting that the rotation (e.g., the continued user interaction) of the rotation portion of the user interface has stopped. The final command message may include a command for adjusting the lighting level based on the final position of the rotation portion.

The processor may be configured to decrease the transmission interval to the initial value (e.g., to return to a normal transmission state) when the rotation (e.g., the continued user interaction) of the rotation portion has stopped. For example, the processor may be configured to increase the transmission frequency to the initial frequency after a timeout period from when the processor detects that the rotation of the rotation portion has stopped.

DETAILED DESCRIPTION

Figure 1A:
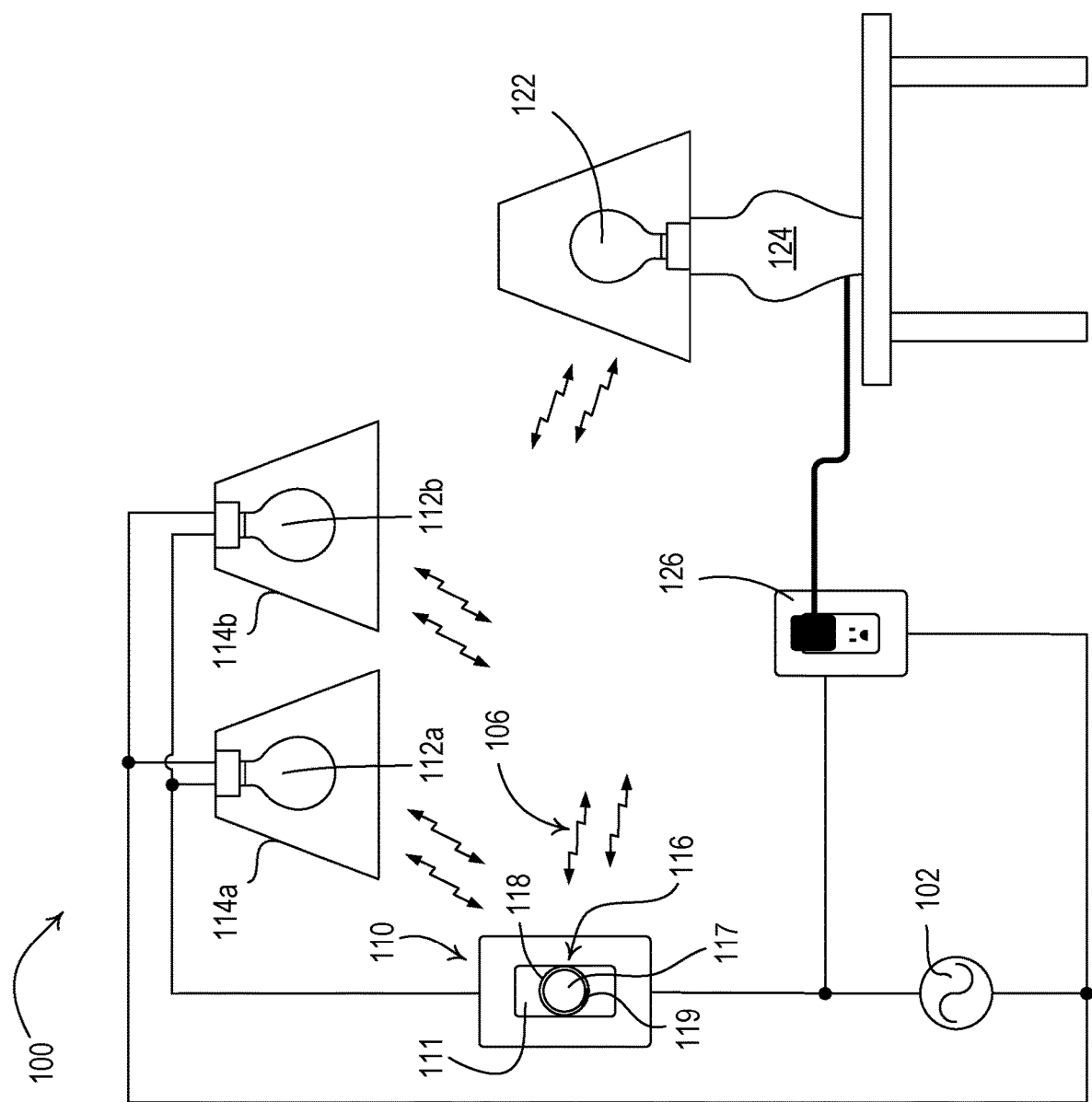
FIGS. 1A and 1B depict examples of a load control system that may implement one or more message types for communicating digital messages.
Figure 1B:
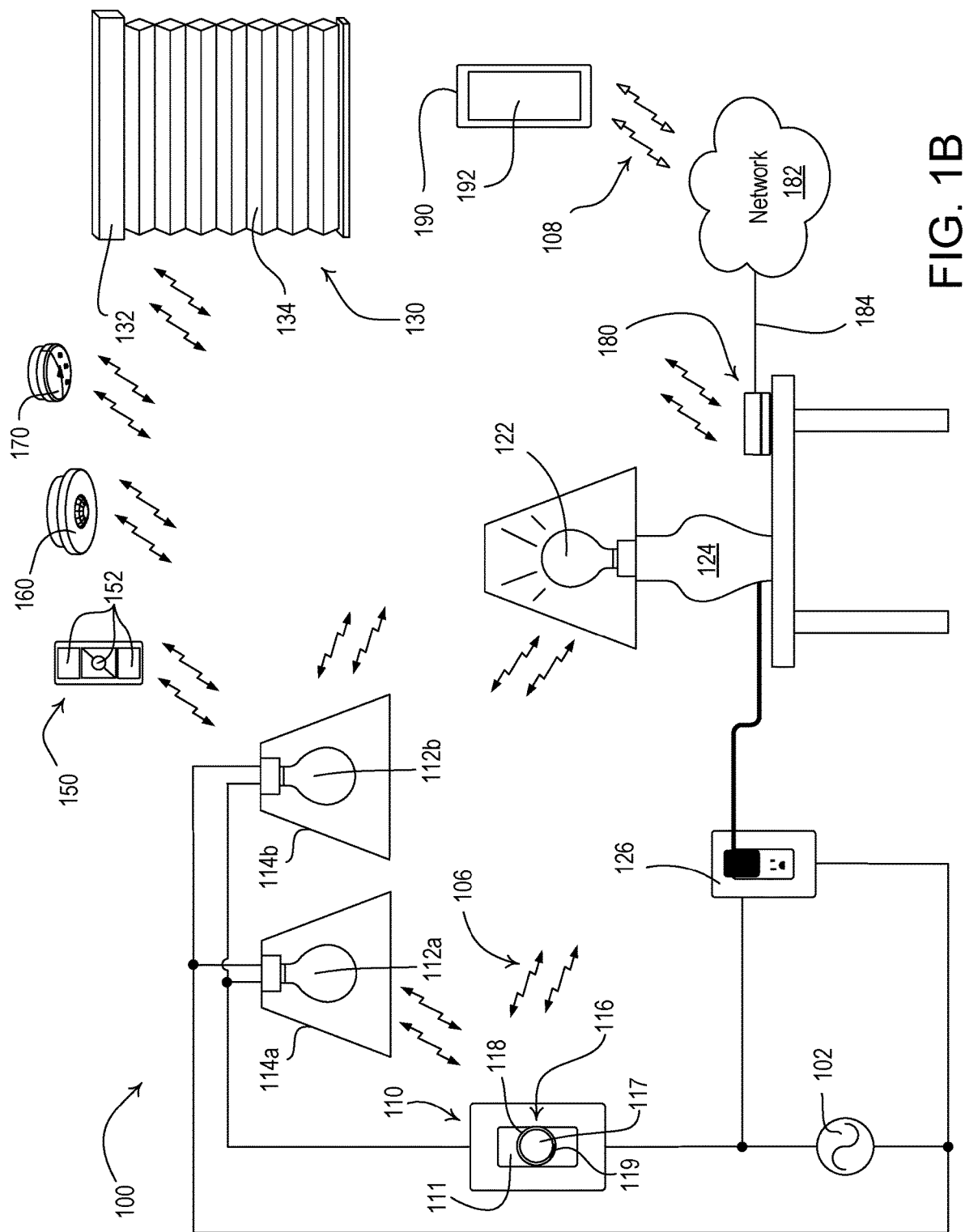

FIGS. 1A and 1B depict examples of a load control system 100 that may implement one or more message types for communicating messages (e.g., digital messages). As shown in FIG. 1A, the load control system 100 may include various control devices, such as controller devices and/or load control devices. The controller device may send digital messages to the load control device to cause the load control device to control an amount of power provided from an AC power source 102 to an electric load in the load control system 100.

Load control devices may control the electrical loads within a room and/or a building. Each load control device may be capable of directly controlling the amount of power provided to an electrical load in response to communication from a controller device. Example load control devices may include lighting devices 112a, 112b, and/or lighting device 122 (e.g., a load control device in light bulbs, ballasts, LED drivers, etc.). The lighting devices may be a lighting load itself, or a device that includes the lighting load and a lighting load controller.

A controller device may indirectly control the amount of power provided to an electrical load by transmitting digital messages to the load control device. The digital messages may include control instructions (e.g., load control instructions) or another indication that causes the load control device to determine load control instructions for controlling an electrical load. Example controller devices may include a remote control device 116. The controller devices may include a wired or wireless device.

Control devices (e.g., controller devices and/or load control devices) may communicate with each other and/or other devices via wired and/or wireless communications. The control devices may communicate using digital messages in a wireless signal. For example, the control devices may communicate via radio frequency (RF) signals 106. The RF signals 106 may be communicated via an RF communication protocol (e.g., ZIGBEE; THREAD; near field communication (NFC); BLUETOOTH; BLUETOOTH LOW ENERGY (BLE), WI-FI; a proprietary communication protocol, such as CLEAR CONNECT or CLEAR CONNECT TYPE X, etc.). The digital messages may be transmitted as multicast messages and/or unicast messages via the RF signals 106.

The lighting device 122 may be installed in a plug-in device 124, such as a lamp (e.g., a table lamp). The plug-in device 124 may be coupled in series electrical connection between the AC power source 102 and the lighting device 122. The plug-in device 124 may be plugged into an electrical receptacle 126 that is powered by the AC power source 102. The plug-in device 124 may be plugged into the electrical receptacle 126 or a separate plug-in load control device that is plugged into the electrical receptacle 126 and configured to control the power delivered to the lighting device 122.

The lighting devices 112a, 112b may be controlled by a wall-mounted load control device 110. Though the lighting devices 112a, 112b are shown in FIG. 1A, any number of lighting devices may be implemented that may be supported by the wall-mounted load control device 110 and/or the AC power source 102. The wall-mounted load control device 110 may be coupled in series electrical connection between the AC power source 102 and lighting devices 112a, 112b. The wall-mounted load control device 110 may include a mechanical switch 111 (e.g., a previously-installed light switch) that may be opened and closed in response to actuations of a toggle actuator (not shown) for controlling the power delivered from the AC power source 102 to the lighting devices 112a, 112b (e.g., for turning on and off the lighting devices 112a, 112b). The lighting devices 112a, 112b may be installed in respective ceiling mounted downlight fixtures 114a, 114b, or other lighting fixture mounted to another surface. The wall-mounted load control device 110 may be adapted to be wall-mounted in a standard electrical wallbox.

The remote control device 116 may be configured to transmit messages via the RF signals 106 for controlling the lighting devices 112a, 112b. For example, the remote control device 116 may be configured to transmit messages via the RF signals 106 to load control devices (e.g., the lighting devices 112a, 112b) that are within a wireless communication range of the remote control device. The remote control device 116 may be battery-powered.

The remote control device 116 may be a retrofit remote control device mounted over the toggle actuator of the mechanical switch 111. The remote control device 116 may be configured to maintain the toggle actuator of the mechanical switch 111 in the "on" position (e.g., by covering the switch when in the "on" position) to maintain the flow of power from the AC power source 102 to the lighting devices 112a, 112b. In addition, the remote control device 116 may be mounted to another structure (e.g., other than the toggle actuator of the mechanical switch 111), such a as wall, may be attached to a pedestal to be located on a horizontal surface, or may be handheld. Further, the wall-mounted load control device 110 may comprise a wall-mounted remote control device that replaces the previously-installed mechanical switch 111 and may be configured to operate as the remote control device 116 to control the lighting devices 112a, 112b (e.g., by transmitting messages via the RF signals 106). Such a wall-mounted remote control device may derive power from the AC power source 102.

The remote control device 116 may comprise a user interface having an actuation portion 117 (e.g., a "toggle" button), an intensity adjustment actuator, such as a rotation portion 118 (e.g., a rotary knob), and a visual indicator, such as a status indicator 119. The actuation portion 117 may be actuated (e.g., pushed in towards the mechanical switch 111) and the rotation portion 118 may be rotated (e.g., with respect to the mechanical switch 111). The remote control device 116 may be configured to transmit messages including commands for turning the lighting devices 112a, 112b, 122 on and off in response to actuations (e.g., presses) of the actuation portion 117 and commands for adjusting a lighting level (e.g., an intensity or brightness) of the lighting devices 112a, 112b, 122 in response to actuations (e.g., rotations) of the rotation portion 118. Though a rotation portion 118 is disclosed, the user interface of the remote control device 116 may include another type of intensity adjustment actuator, such as a linear slider, an elongated touch sensitive actuator, a rocker switch, separate raise/lower actuators, or another form of intensity adjustment actuator.

The lighting devices 112a, 112b may be turned on or off, or the lighting level may be adjusted, in response to the remote control device 116 (e.g., in response to actuations of the actuation portion 117 of the remote control device 116). For example, the lighting devices 112a, 112b may be toggled on or off by a toggle event identified at the remote control device 116. The toggle event may be a user event identified at the remote control device 116. The actuation portion 117 of the remote control device 116 may be actuated to toggle the lighting devices 112a, 112b on or off. The rotation portion 118 of the remote control device 116 may be rotated to adjust the intensities of the lighting devices 112a, 112b. The toggle event may be identified when the rotation portion 118 of the remote control device 116 is turned by a predefined amount or for a predefined time, and/or the actuation portion 117 of the remote control device 116 is actuated. The lighting level of the lighting devices 112a, 112b may be increased or decreased by rotating the rotation portion 118 of the remote control device 116 in one direction or another, respectively. Though shown as comprising a rotary knob in FIGS. 1A and 1B, the remote control device 116 may comprise a paddle switch that may be actuated by a user, a linear control on which a user may swipe a finger, a raise/lower slider, a rocker switch, or another type of control capable of receiving user interface events as commands.

The remote control device 116 may provide feedback (e.g., visual feedback) to a user of the remote control device 116 on the status indicator 119. The status indicator 119 may provide different types of feedback. The feedback may include feedback indicating actuations by a user or other user interface event, a status of electrical loads being controlled by the remote control device 116, and/or a status of the load control devices being controlled by the remote control device 116. The feedback may be displayed in response to user interface event and/or in response to messages received that indicate the status of load control devices and/or electrical loads.

The status indicator 119 may be illuminated by one or more light emitting diodes (LEDs) for providing feedback. The status indicator 119 may be a light bar included around the entire perimeter of the remote control device 116, or a portion thereof. The status indicator 119 may also, or alternatively be a light bar in a line on the remote control device 116, such as when the remote control device is a paddle switch or a linear control, for example.

Example types of feedback may include illumination of the entire status indicator 119 (e.g., to different lighting levels), blinking or pulsing one or more LEDs in the status indicator 119, changing the color of one or more LEDs on the status indicator 119, and/or illuminating different sections of one or more LEDs in the status indicator 119 to provide animation (e.g., clockwise and counter clockwise animation for raising and lowering a lighting level). The feedback on the status indicator 119 may indicate a status of an electrical load or a load control device, such as a lighting level for lights (e.g., lighting devices 112a, 112b, 122), a volume level for audio devices, a shade level for a motorized window treatment, and/or a speed for fans or other similar types of devices that operate at different speeds. The feedback on the status indicator 119 may change based on the selection of different presets. For example, a different LED or LEDs may be illuminated on the status indicator 119 to identify different presets (e.g., preset lighting levels for the lighting devices 112a, 112b, 122, and/or other preset configurations for load control devices).

The remote control device 116 may transmit digital messages via the RF signals 106 to control the lighting devices 112a, 112b, 122. The remote control device 116 may be configured to transmit an on command for turning the lighting devices 112a, 112b, 122 on (e.g., an "on" event). For example, the on command may case the lighting devices 112a, 112b, 122 to turn on to a maximum lighting level (e.g., a maximum intensity, such as 100%), to a predetermined lighting level, and/or to a previous lighting level (e.g., an "on" event). In addition, the remote control device 116 may be configured to transmit an off command for turning the lighting devices 112a, 112b, 122 off (e.g., 0%). Further, the remote control device 116 may be configured to transmit a toggle command for toggling the state of the lighting devices 112a, 112b, 122 (e.g., causing the lighting devices to turn from off to on (e.g., an "on" event, or from on to off (e.g., an "off" event). The lighting level for the "on" event and/or the "off" event may also, or alternatively, be stored at the lighting devices 112a, 112b, 122, and the lighting devices may change to the lighting level upon receiving an indication of the occurrence of the "on" event or "off" event at the remote control device 116. The digital messages may cause an "on" event when the remote control device 116 is rotated a predefined distance or time in one direction. As an example, the remote control device 116 may transmit digital messages when the remote control device 116 is identified as being rotated for 100 milliseconds (ms). The digital messages may indicate an "off" event when the remote control device 116 is rotated a predefined distance or time in the opposite direction. The digital messages may indicate an "on" event or an "off" event when the actuation portion 117 of the remote control device 116 is actuated.

The remote control device 116 may be configured to adjust the intensities of the lighting devices 112a, 112b, 122 using absolute control in order to control the intensities of the lighting devices 112a, 112b, 122 to an absolute level (e.g., a specific level). For example, the remote control device 116 may transmit digital messages including a move-to-level command (e.g., a go-to-level or go-to command) that identifies a lighting level to which the lighting devices may change. The move-to-level command may include the amount of time over which the lighting level may be changed at the lighting devices. The move-to-level command may cause an "on" event or an "off" event to turn the lighting devices 112a, 112b, 122 on or off, respectively. For example, the "on" event may be caused by a move-to-level command with a lighting level of 100%, or another preset lighting level. The "off" event may be caused by a move-to-level command with a lighting level of 0%.

In response to a user interface event (e.g., actuation, rotation, finger swipe, etc.) or a proximity sensing event (e.g., a sensing circuit sensing an occupant near the remote control device 116) at the remote control device 116, the remote control device 116 may determine a starting point (e.g., a dynamic starting point) from which the lighting level of one or more of the lighting devices 112a, 112b, 122 may be controlled. Each rotation of the rotation portion 118 may cause the remote control device 116 to determine the dynamic starting point from which control may be performed. In response to the user interface event and/or a proximity sensing event (e.g., a sensing circuit sensing an occupant near the remote control device 116), the remote control device 116 may transmit a status query message to the lighting devices 112a, 112b, 122 to query for a current status (e.g., after awakening from sleep mode). The current status of one or more of the lighting devices 112a, 112b, 122 may be used to set the dynamic starting point from which the remote control device 116 may perform control. For example, the remote control device 116 may set the dynamic starting point of the rotation portion 118 to the current lighting level (e.g., on, off, 10%, 20%, etc.) of the first of the lighting devices 112a, 112b, 122 to respond to the status query message, or a predefined lighting device 112a, 112b, 122. Examples of remote control devices configured to transmit status query messages prior to transmitting commands are described in greater detail in commonly-assigned U.S. Pat. No. 10,420,194, issued Sep. 17, 2019, entitled CONTROLLING GROUPS OF ELECTRICAL LOADS, the entire disclosure of which is hereby incorporated by reference.

In another example, the remote control device 116 may set the dynamic starting point of the rotation portion 118 based on the lighting levels of multiple lighting devices 112a, 112b, 122. The remote control device 116 may set the dynamic starting point of the rotation portion 118 to an average lighting level (e.g., on, off, 10%, 20%, etc.) of the lighting devices 112a, 112b, 122, or a common lighting level (e.g., on, off, 10%, 20%, etc.) of a majority of the lighting devices 112a, 112b, 122, for example. The remote control device 116 may set the dynamic starting point of the rotation portion 118 to a maximum lighting level of the lighting devices 112a, 112b, 122 when the rotation portion 118 is being rotated clockwise to raise the lighting level of the lighting devices, or a minimum level of the lighting devices 112a, 112b, 122 when the rotation portion 118 is being rotated counterclockwise to lower the lighting level of the lighting devices, for example. The status indicator 119 may be illuminated as feedback to reflect the dynamic starting point to the user. For example, the remote control device 116 may illuminate a portion of the status indicator 119 that reflects the lighting level that is set as the dynamic starting point.

The remote control device 116 may calculate an increase or decrease in the lighting level from the dynamic starting point based on the user interface event. For example, the remote control device 116 may calculate an increase or decrease in the lighting level based on the distance or amount of time the rotation portion 118 is turned. The rotation from the point of the initial interaction by the user with the rotation portion 118 may be used to identify the increase or decrease in the lighting level from the dynamic starting point. When the remote control device 116 includes a linear control, the remote control device 116 may calculate an increase or decrease in the lighting level based on the distance or amount of time the user swipes a finger up or down on the linear control. The user's finger swipe from the point of the initial interaction by the user with the linear control may be used to identify the increase or decrease in the lighting level from the dynamic starting point.

The updated lighting level may be calculated from the user's initial interaction and stored at the remote control device 116. The updated lighting level may be included in a move-to-level command that is transmitted from the remote control device 116 to the lighting devices 112a, 112b, 122 when the remote control device 116 is using absolute control.

The visual feedback displayed by the status indicator 119 may be provided in or derived from the information in the move-to-level command when the remote control device 116 is using absolute control. For example, the remote control device 116 may reflect the lighting level transmitted in the move-to-level command in the status indicator 119.

The remote control device 116 may transmit digital messages configured to increase the lighting level of the lighting devices 112a, 112b, 122 when the rotation portion 118 is rotated in a direction (e.g., clockwise). As previously mentioned, the remote control device 116 may be configured to adjust the intensities of the lighting devices 112a, 112b, 122 to an absolute level using absolute control. In addition, or alternatively, the remote control device 116 may be configured to adjust the intensities of the lighting devices 112a, 112b, 122 using relative control to adjust the intensities of the light devices 112a, 112b, 122 by a relative amount. For example, the remote control device 116 may transmit digital messages configured to decrease the lighting level of the lighting devices 112a, 112b, 122 when the remote control device 116 is rotated in the opposite direction (e.g., counterclockwise). The digital messages may include a move-with-rate command, which may cause the lighting devices 112a, 112b, 122 to change their respective lighting level by a predefined amount. The move-with-rate command may include an amount of time over which the lighting level may be changed at the lighting devices. The move-with-rate command may cause the lighting devices 112a, 112b, 122 to retain their relative or proportional lighting levels, and/or difference in respective lighting levels. The remote control device 116 may send digital messages to increase or decrease the lighting level by a predefined amount when rotated a predefined distance or for a predefined time. The amount of the increase or decrease may be indicated in the digital messages or may be predefined at the lighting devices 112a, 112b, 122. The digital messages may also include a move-to-level-over-time command, which may include both a lighting level to which to control the lighting devices 112a, 112b, 122, and an amount of time over which the lighting level may be changed at the lighting devices.

The remote control device 116 may transmit digital messages that include move-with-rate commands to increase or decrease the lighting level of the lighting devices 112a, 112b, 122 in predefined increments as the user turns the remote control device 116 a predefined distance or time in one direction or another. The remote control device 116 may continue to transmit digital messages to the lighting devices 112a, 112b, 122 as the user continues to turn the remote control device 116. For example, the remote control device 116 may identify a rotation of a predefined distance or for a predefined time and send one or more digital messages to instruct the lighting devices 112a, 112b, 122 to each increase by ten percent (10%). The remote control device 116 may identify a continued rotation of a predefined distance or time and send digital messages to instruct the lighting devices 112a, 112b, 122 to increase by ten percent (10%) again.

The remote control device 116 may also, or alternatively, send digital messages for a direct command (e.g., "on" command, "off" command, toggle command, etc.) to turn on/off the lighting devices 112a, 112b, 122. The remote control device 116 may transmit one or more digital messages to the lighting devices 112a, 112b, 122 when an on event or an off event are detected. For example, the remote control device 116 may identify a rotation or actuation and send digital messages to instruct the lighting devices 112a, 112b, 122 to turn on and/or off. The remote control device 116 may operate by sending a move-with-rate command after turning on. For example, the remote control device 116 may identify a rotation of a predefined distance or time after turning on and send digital messages to instruct the lighting devices 112a, 112b, 122 to increase and/or decrease their lighting levels by a predefined lighting level (e.g., approximately 10%).

The remote control device 116 may transmit the digital messages as multicast messages and/or unicast messages via the RF signal 106. For example, the digital messages including a direct command (e.g., an on command, an off command, and/or a toggle command) and/or a move-to-level command that causes an "on" event or an "off" event may be transmitted as multicast messages. In addition, the digital messages including the move-to-level command that causes the lighting devices 112a, 112b, 122 to adjust their intensities by a large amount may be transmitted as multicast messages. The multicast messages may be communicated efficiently from the remote control device 116 as a single message may be transmitted to multiple lighting devices, such as lighting devices 112a, 112b, 122, at once. The load control instructions in the multicast messages may be received and implemented by multiple lighting devices, such as lighting devices 112a, 112b, 122, at the same time, or at nearly the same time with a minor delay due to differences in latency, as a single message is being received at a group of devices within the same wireless range. For example, the lighting devices 112a, 112b, 122 may not transmit acknowledgement messages to the remote control device 116 in response to receiving multicast messages from the remote control device.

The multicast messages may include a group identifier for controlling the lighting devices 112a, 112b, 122 that are a part of the multicast group. The lighting devices 112a, 112b, 122 may be a part of the multicast group when they are associated with the group identifier (e.g., by having the group identifier stored thereon) for recognizing multicast messages transmitted to the group. The lighting devices 112a, 112b, 122 that are associated with the group identifier may recognize the multicast messages and control the corresponding lighting load according to the command in the multicast messages. The lighting devices 112a, 112b, 122 may forward the multicast messages with the group identifier for identification and load control by other lighting devices associated with the group identifier. The group may be formed at commissioning or configuration of the load control system 100. The remote control device 116 may generate the group identifier and send the group identifier to the lighting devices 112a, 112b, 122 and/or a system controller (e.g., a hub device) when the remote control device 116 is in an association mode (e.g., entered upon selection of one or more buttons). The devices that store the group identifier may be part of the group of devices that are associated with the remote control device 116 and can respond to group messages.

The digital messages may also be transmitted via the RF signals 106 as multicast messages. The number of multicast messages sent in the wireless communication network may be limited according to a standard, for example, to prevent interference or link saturation on the network. For example, using the ZIGBEE® protocol, a remote control device may be prevented from transmitting more than nine (9) multicast messages over a nine (9) second period of time to control lighting devices. If the remote control device exceeds the limit, the lighting devices may lock up for a period of time (e.g., a number of seconds) before allowing control from another message. Thus, the transmission of multicast messages may be rate limited, which may cause communications to the lighting devices to be interrupted or limited. For example, communication to the lighting device may be stopped when the rate limit is exceeded, and the transition in lighting levels may be discrete or choppy, which may be undesirable.

Accordingly, digital messages including the move-to-level command that do not cause the lighting devices 112a, 112b, 122 to adjust their intensities by a large amount may be transmitted as multicast messages. For example, the digital messages including the move-with-rate command or the move-to-level command may be transmitted as unicast messages. Unicast messages may be sent from the remote control device 116 directly to each of the lighting devices 112a, 112b, 122. Also, or alternatively, unicast messages may be sent from the remote control device 116 to each of the lighting devices 112a, 112b, 122 via one or more hops (e.g., intermediary devices in the load control system that may retransmit the message to another control device for retransmission and/or to one of the respective lighting devices 112a, 112b, 122). The remote control device 116 may individually send a unicast message to each of the lighting devices 112a, 112b, 122 with which the remote control device 116 is associated for performing load control. The remote control device 116 may have the unique identifier of each of the lighting devices 112a, 112b, 122 with which it is associated stored in memory. The remote control device 116 may generate a separate unicast message for each lighting device 112a, 112b, 122 and address the unicast messages to the lighting devices 112a, 112b, 122 independently. The unicast messages may also include the unique identifier of the remote control device 116. The lighting devices 112a, 112b, 122 may identify the unicast messages communicated to them by identifying their own unique identifier and/or a corresponding identifier of the remote that are stored in an association dataset. The lighting devices 112a, 112b, 122 may operate according to the instructions (e.g., load control instructions) in the digital messages comprising their own unique identifier and/or the unique identifier of an associated device, such as the remote control device 116. For example, when using some RF communication protocols (e.g., such as, ZIGBEE and THREAD), the lighting devices 112a, 112b, 122 may each transmit an acknowledgement message to the remote control device 116 in response to receiving a unicast message from the remote control device. However, for other RF communication protocols (e.g., such as, BLUETOOTH), the lighting devices 112a, 112b, 122 may not transmit acknowledgement messages to the remote control device 116 in response to receiving unicast messages from the remote control device.

Embodiments described herein are not limited to remote control devices, but other controller devices may also be used in the same, or similar, manner. For example, embodiments may include wired control devices and/or plug-in control devices that communicate digital messages as described herein.

FIG. 1B shows an example of the load control system 100 having other devices. For example, the load control system 100 may include other control devices, such as controller devices and/or load control devices. The load control devices may be capable of controlling the amount of power provided to a respective electrical load based on digital messages received from the controller devices, which may be input devices. The digital messages may include load control instructions or another indication that causes the load control device to determine load control instructions for controlling an electrical load.

Examples of load control devices may include a motorized window treatment 130 and/or the lighting devices 112a, 112b, 122, though other load control devices may be implemented. The controller devices may include the batter powered remote control device 150, though other controller devices may be implemented. The controller devices may perform communications in a configuration similar to the remote control device 116 as described herein. The load control devices may perform communications in a configuration similar to the lighting devices 112a, 112b, 122 as described herein.

The load control devices may receive digital messages via wireless signals, e.g., radio-frequency (RF) signals 106. The wireless signals may be transmitted by the controller devices. In response to the received digital messages, the respective lighting devices 112a, 112b, 122 may be turned on and off, and/or the intensities of the respective lighting devices 112a, 112b, 122 may be increased or decreased. In response to the received digital messages, the motorized window treatment 130 may increase or decrease a level of a covering material 134.

The battery-powered remote control device 150 may include one or more actuators 152 (e.g., one or more of an on button, an off button, a raise button, a lower button, or a preset button). The battery-powered remote control device 150 may transmit RF signals 106 in response to actuations of one or more of the actuators 152. The battery-powered remote control device 150 may be handheld. The battery-powered remote control device 150 may be mounted vertically to a wall, or supported on a pedestal to be mounted on a tabletop. The battery-powered remote control device 150 may be a wireless device capable of controlling a load control device via wireless communications. Examples of remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Pat. No. 8,471,779, issued Jun. 25, 2013, entitled WIRELESS BATTERY-POWERED REMOTE CONTROL WITH LABEL SERVING AS ANTENNA ELEMENT, the entire disclosures of which are hereby incorporated by reference.

The occupancy sensor 160 may be configured to detect occupancy and/or vacancy conditions in the space in which the load control system 100 is installed. The occupancy sensor 160 may transmit digital messages to load control devices via the RF communication signals 106 in response to detecting the occupancy or vacancy conditions. The occupancy sensor 160 may operate as a vacancy sensor, such that digital messages are transmitted in response to detecting a vacancy condition (e.g., digital messages may not be transmitted in response to detecting an occupancy condition). The occupancy sensor 160 may enter an association mode and may transmit association messages via the RF communication signals 106 in response to actuation of a button on the occupancy sensor 160. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING, the entire disclosure of which is hereby incorporated by reference.

The daylight sensor 170 may be configured to measure a total light level in the space in which the load control system 100 is installed. The daylight sensor 170 may transmit digital messages including the measured light level via the RF communication signals 106 for controlling load control devices in response to the measured light level. The daylight sensor 170 may enter an association mode and may transmit association messages via the RF communication signals 106 in response to actuation of a button on the daylight sensor 170. Examples of RF load control systems having daylight sensors are described in greater detail in commonly-assigned U.S. Pat. No. 8,451,116, issued May 28, 2013, entitled WIRELESS BATTERY-POWERED DAYLIGHT SENSOR, the entire disclosure of which is hereby incorporated by reference.

The motorized window treatment 130 may be mounted in front of a window for controlling the amount of daylight entering the space in which the load control system 100 is installed. The motorized window treatment 130 may include, for example, a cellular shade, a roller shade, a drapery, a Roman shade, a Venetian blind, a Persian blind, a pleated blind, a tensioned roller shade system, or another suitable motorized window covering. The motorized window treatment 130 may include a motor drive unit 132 for adjusting the position of a covering material 134 of the motorized window treatment 130 in order to control the amount of daylight entering the space. The motor drive unit 132 of the motorized window treatment 130 may have an RF receiver and an antenna mounted on or extending from a motor drive unit 132 of the motorized window treatment 130. The motor drive unit 132 may respond to digital messages to increase or decrease the level of the covering material 134. The motor drive unit 132 of the motorized window treatment 130 may be battery-powered or may receive power from an external direct-current (DC) power supply. Examples of battery-powered motorized window treatments are described in greater detail in commonly-assigned U.S. Pat. No. 8,950,461, issued Feb. 10, 2015, entitled MOTORIZED WINDOW TREATMENT, and U.S. Pat. No. 9,115,537, issued Aug. 25, 2015, entitled BATTERY-POWERED ROLLER SHADE SYSTEM, the entire disclosures of which are hereby incorporated by reference Digital messages transmitted by the controller devices may include a command and/or identifying information, such as a serial number (e.g., a unique identifier) associated with the transmitting controller device. Each of the controller devices may be associated with the lighting devices 112a, 112b, 122 and/or the motorized window treatment 130 during a configuration procedure of the load control system 100, such that the lighting devices 112a, 112b, 122 and/or the motorized window treatment 130 may be responsive to digital messages transmitted by the controller devices via the RF signals 106. Examples of associating wireless control devices during a configuration procedure are described in greater detail in commonly-assigned U.S. Patent Application Publication No. 2008/0111491, published May 15, 2008, entitled RADIO-FREQUENCY LIGHTING CONTROL SYSTEM, and U.S. Pat. No. 9,368,025, issued Jun. 14, 2016, entitled TWO-PART LOAD CONTROL SYSTEM MOUNTABLE TO A SINGLE ELECTRICAL WALLBOX, the entire disclosures of which are hereby incorporated by reference.

The load control system 100 may include a system controller 180 (e.g., a hub device or a system bridge) configured to enable communication with a network 182, e.g., a wireless or wired local area network (LAN). For example, the system controller 180 may be connected to a network router (not shown) via a wired digital communication link 184 (e.g., an Ethernet communication link). The network router may allow for communication with the network 182, e.g., for access to the Internet. The system controller 180 may be wirelessly connected to the network 182, e.g., using wireless technology, such as WI-FI® technology, cellular technology, etc. The system controller 180 may be configured to transmit communication signals (e.g., RF signals 106) to the lighting devices 112a, 112b, 122, and/or the motorized window treatment 130 for controlling the devices in response to digital messages received from external devices via the network 182. The system controller 180 may be configured to transmit and/or receive RF signals 106. The system controller 180 may be configured to transmit digital messages via the network 182 for providing data (e.g., status information) to external devices.

The system controller 180 may operate as a central controller for the load control system 100, and/or relay digital messages between the control devices (e.g., lighting devices, motorized window treatments, etc.) of the load control system and the network 182. The system controller 180 may receive digital messages from a controller device and configure the digital message for communication to a load control device. For example, the system controller 180 may configure multicast messages and/or unicast messages for transmission as described herein. The system controller 180 may be on-site at the load control system 100 or at a remote location. Though the system controller 180 is shown as a single device, the load control system 100 may include multiple hubs and/or the functionality thereof may be distributed across multiple devices.

The load control system 100 may include a network device 190, such as, a smart phone, a personal computer (PC), a laptop, a wireless-capable media device (e.g., a media player, gaming device, or television), a tablet device (e.g., a hand-held computing device), a wireless-communication-capable television, or any other suitable network communication or Internet-Protocol-enabled device. The network device 190 may be operable to transmit digital messages in one or more Internet Protocol packets to the system controller 180 via RF signals 108, either directly or via the network 182. The RF signals 108 may be communicated using a different protocol and/or wireless band than the RF signals 106. In another example, the RF signals 108 and the RF signals 106 may be the same. Examples of load control systems operable to communicate with network devices on a network are described in greater detail in commonly-assigned U.S. Pat. No. 10,271,407, issued Apr. 23, 2019, entitled LOAD CONTROL DEVICE HAVING INTERNET CONNECTIVITY, the entire disclosure of which is hereby incorporated by reference.

The network device 190 may include a visual display 192. The visual display 192 may include a touch screen that may include, for example, a capacitive touch pad displaced overtop the visual display, such that the visual display may display soft buttons that may be actuated by a user. The network device 190 may include a plurality of hard buttons, e.g., physical buttons (not shown), in addition to the visual display 192. The network device 190 may download a product control application for allowing a user of the network device 190 to control the load control system 100. In response to actuations of the displayed soft buttons and/or hard buttons, the network device 190 may transmit digital messages to the load control devices and/or the system controller 180 through the wireless communications described herein.

The operation of the load control system 100 may be programmed and configured using the system controller 180 and/or network device 190. An example of a configuration procedure for a wireless load control system is described in greater detail in commonly-assigned U.S. Pat. No. 10,027,127, issued Jul. 17, 2018, entitled COMMISSIONING LOAD CONTROL SYSTEMS, the entire disclosure of which is hereby incorporated by reference.

The lighting devices 112a, 112b, 122 may each be included in a group of lighting devices that are associated with a common control device, such as the remote control device 116. For example, each of the lighting devices 112a, 112b, 122 may store the unique identifier of the remote control device 116 during an association mode to enable the lighting devices 112a, 112b, 122 to be controlled by digital messages from the remote control device 116 that include control instructions. The system controller 180 may store the associations between each of the lighting devices 112a, 112b, 122 and the remote control device 116 during an association mode. The association information may be used by the system controller 180 for routing digital messages to the lighting devices 112a, 112b, 122, or the lighting devices 112a, 112b, 122 may receive digital messages from the remote control device 116 directly.

The remote control device 116 may be configured to transmit messages to the lighting devices 112a, 112b, 122 via the system controller 180. For example, the remote control device 116 may be configured to transmit unicast messages to the system controller 180. The system controller 180 may be configured to transmit an acknowledgement message to the remote control device 116 in response to receiving a unicast message from the remote control device. The system controller 180 may be configured to transmit unicast and/or multicast messages to the lighting devices 112a, 112b, 122 for controlling the lighting devices in response to the unicast message received from the remote control device 116. For example, the remote control device 116 may send transmit a message including a toggle command or an on/off command (e.g., an "on" command or an "off" command) for controlling the lighting devices 112a, 112b, 122 to toggle the lighting devices 112a, 112b, 122 from an "on" state to an "off" state, or vice versa. The remote control device 116 may transmit a unicast message including the toggle command or the on/off command to the system controller 180, which may transmit a multicast message that is received at each of the lighting devices 112a, 112b, 122 In addition, the remote control device 116 may transmit a unicast message including a move-to-level command or a move-with-rate command to the system controller 180, which may transmit unicast messages that are independently directed to each of the lighting devices 112a, 112b, 122.

The remote control device 116 may use the lighting level of a lighting device as a starting point (e.g., a dynamic starting point) upon which dimming is performed for the group of lighting devices 112a, 112b, 122. For example, in response to the status query message from the remote control device 116, the lighting device 112a may respond by transmitting a status response message indicating that the lighting device 112 is at a lighting level of 10%. The remote control device 116 may set the lighting level identified by the lighting device 122 as the dynamic starting point upon which control of the lighting level for the group of lighting devices 112a, 112b, 122 may be performed. The remote control device 116 may identify a continued rotation for increasing the lighting level by an additional 20%. The remote control device 116 may add this 20% to the dynamic starting point of 10% that was indicated as the current lighting level of the lighting device 112a that responded to the previous status query message from the remote control device 116. The remote control device 116 may send a digital message to the group of lighting devices 112a, 112b, 122 to control the group of lighting devices 112a, 112b, 122 to an absolute lighting level of 30%. The digital message may include a go-to-level command that is configured to control each of the lighting devices 112a, 112b, 122 to a lighting level of 30%. Each of the lighting devices 112a, 112b, 122 may receive the digital message (e.g., as a unicast message or a multicast message) and be controlled to the absolute lighting level of 30%, unless the lighting device is already at the indicated lighting level. When the group of lighting devices 112a, 112b, 122 are in the same state, the group of lighting devices 112a, 112b, 122 may be controlled as a group. For example, the group of lighting devices 112a, 112b, 122 may be controlled together from 10% to 30%. When the state of the group of lighting devices 112a, 112b, 122 is out of sync, the lighting devices 112a, 112b, 122 may be controlled differently to reach the indicated lighting level. For example, the lighting devices 112a, 112b, 122 that are above the indicated lighting level may decrease the lighting level to meet the indicated lighting level. The lighting devices 112a, 112b, 122 that are below the indicated lighting level may increase in the lighting level to meet the indicated lighting level. The lighting devices 112a, 112b, 122 that are already in the state indicated in the digital message may go unchanged in response to the digital message from the remote control device 116.

The lighting devices 112a, 112b, 122 may fade from one lighting level to another lighting level (e.g., be dimmed between lighting levels over a fade time and/or at a fade rate) in response to receiving a command. For example, the lighting devices 112a, 112b, 122 may be dimmed at a rate or over a period of time such that each of the lighting devices 112a, 112b, 122 that is not already at the indicated lighting level reaches the lighting level at the same time. For example, the remote control device 116 may send the go-to-level command with an amount of time or fade rate over which the lighting devices 112a, 112b, 122 are to be dimmed until the lighting devices 112a, 112b, 122 reach the indicated lighting level (e.g., different fade rates or fade times may be transmitted to each of the lighting devices 112a, 112b, 122). The lighting devices 112a, 112b, 122 may be dimmed over the indicated period of time to the lighting level indicated in the go-to-level command. When one or more of the lighting devices 112a, 112b, 122 are at different lighting levels, the lighting devices 112a, 112b, 122 may be sent unicast messages with different fade rates such that the lighting devices 112a, 112b, 122 at different lighting levels reach the lighting level indicated in the go-to-level command at the same time. The fade time may vary in a predetermined amount for each level the lighting level may be increased or decreased.

The system controller 180 may operate as a parent device (e.g., a master device) that may be configured to monitor the state of child devices (e.g., slave devices), such as lighting devices 112a, 112b, 122, and determine the appropriate command to be transmitted in response to a user interface event based on the state of the slave devices. Though the system controller 180 may be described herein as being a master device for controlling a group of lighting devices, other control devices (e.g., one of the lighting devices 112a, 112b, 122, remote control device 150, occupancy sensor 160, daylight sensor 170, network device 190, motorized window treatment 132, a remote computing device, etc.) may be assigned as a master device that operates as described herein for the system controller 180. When a lighting device 112a, 112b, 122 is assigned as the master device, the lighting device 112a, 112b, 122 may already know its own state, but may monitor the state of other slave devices. Though other devices may operate as the master device, they may still communicate via the system controller 180.

The system controller 180 may keep track of the on/off state of each of the lighting devices 112a, 112b, 122 after being implemented in the load control system 100. Upon initial implementation into the load control system, the system controller 180 may transmit a status query message to the lighting devices 112a, 112b, 122 to query for their current on/off state. The status query message may be sent as a multicast message, or individual unicast messages, to each of the lighting devices 112a, 112b, 122. The lighting devices 112a, 112b, 122 may return the current on/off state, which may be stored locally thereon. The system controller 180 may identify commands communicated to the lighting devices 112a, 112b, 122 and maintain the current on/off state of the lighting devices 112a, 112b, 122 in memory. The digital messages that are communicated to the lighting devices 112a, 112b, 122 for controlling the on/off state may be monitored to determine the current on/off state, without sending an initial status query message. The system controller 180 may be powered and/or awake at all times (e.g., at all times than the lighting devices 112a, 112b, 122 are also powered), such that the system controller 180 is able to monitor the states of the lighting devices by listening to the messages transmitted by the lighting devices. In addition, the system controller 180 may enter a sleep mode and periodically wake up to transmit status query messages to the lighting devices 112a, 112b, 122 to determine the on/off states of the lighting devices.

When the system controller 180 receives an indication of a toggle event from the remote control device 116, the system controller 180 may choose the command to send, or whether to send a command, to the lighting devices 112a, 112b, 122. The decision at the system controller 180 may be based on the current on/off state of the lighting devices 112a, 112b, 122. The system controller 180 may identify whether the on/off state across the group of lighting devices 112a, 112b, 122 is consistent. If the on/off state across the group of lighting devices 112a, 112b, 122 is consistent, the system controller 180 may send the toggle command, or an "on" command or "off" command, to the lighting devices 112a, 112b, 122 to toggle the on/off state of the group of lighting devices 112a, 112b, 122.

The lighting devices 112a, 112b, 122 that change an on/off state in response to an "on" command or an "off" command may send a state update message to the system controller 180 to indicate the change in on/off state. The system controller 180 may receive the state update message from the lighting devices 112a, 112b, 122 that change state in response to the received "on" command or the received "off" command. The lighting devices that fail to change the on/off state in response to the command from the system controller 180 may be unresponsive. For example, the system controller 180 may send an "off" command to the lighting devices 112a, 112b, 122 and the lighting device 122 may update the on/off state to the "off" state. The lighting device 122 may send a response message to the system controller 180 to indicate the change in state. The system controller 180 may store the updated state and/or confirm the state of the unresponsive devices. The system controller 180 may, alternatively, store the updated state of the lighting device 122 after sending the command. As the system controller 180 may be maintaining the on/off state of the lighting devices 112a, 112b, 122, the remote control device 116 may go to sleep after transmitting a message in response to the toggle event.

Figure 2A:
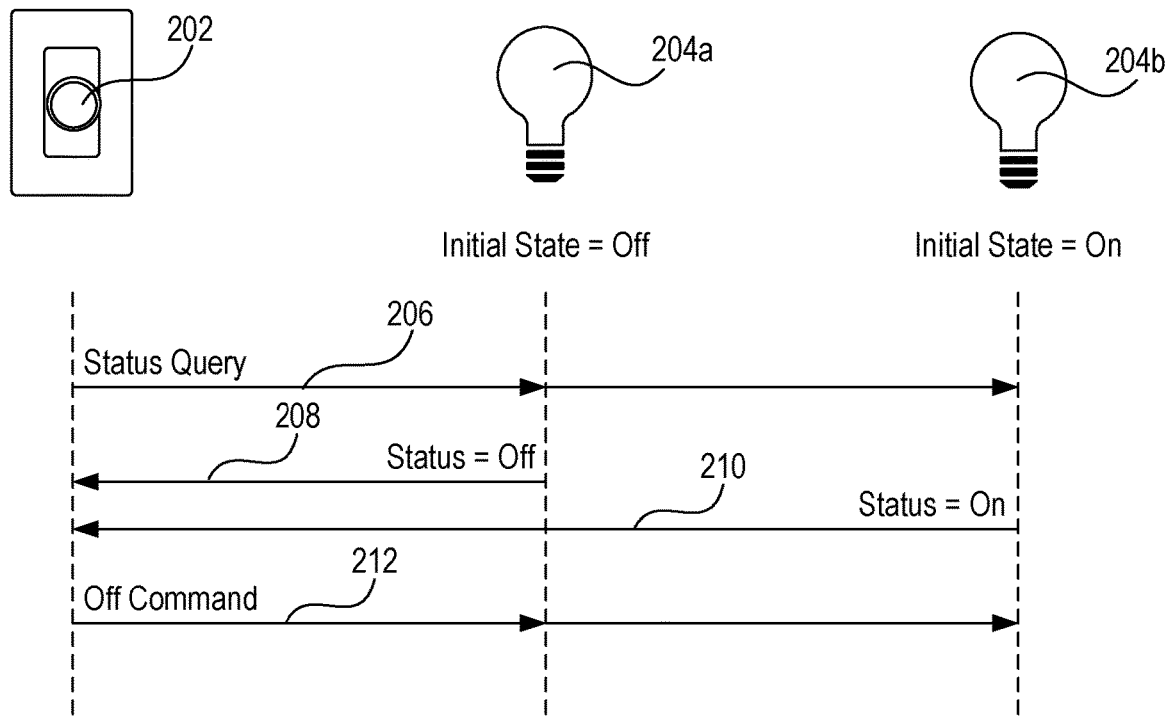
FIGS. 2A-2C are communication flow diagrams depicting example message flows for querying for a current status of lighting devices and generating lighting control commands in response to the identified status.
Figure 2B:
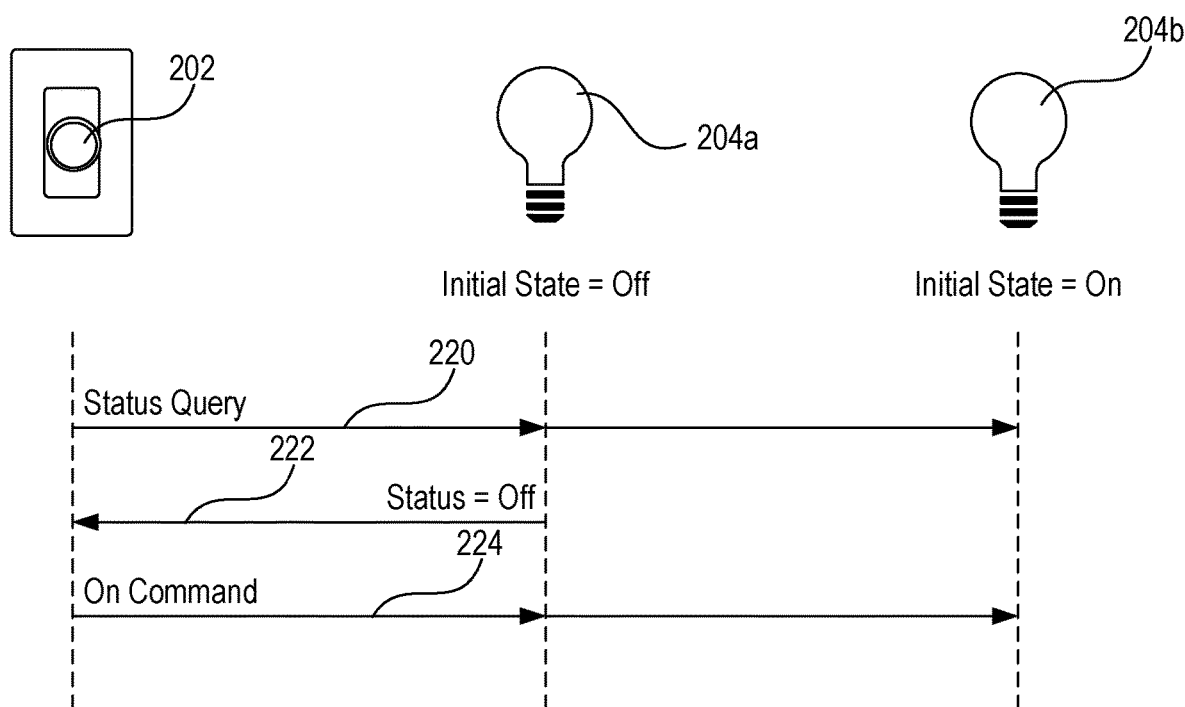
Figure 2C:
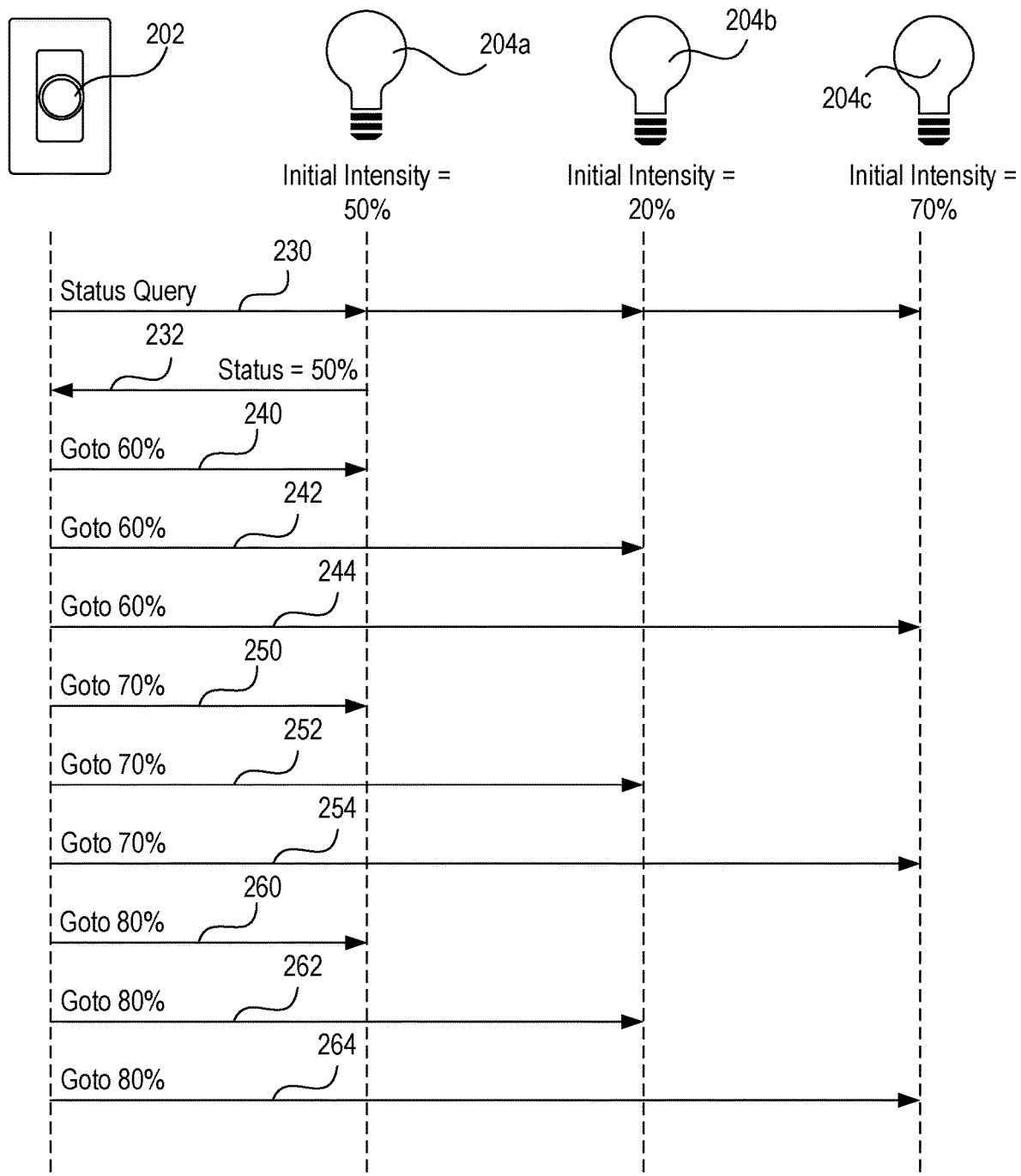

FIGS. 2A-2C are communication flow diagrams depicting example message flows for generating lighting control commands in response to an actuation of an actuator (e.g., the actuation portion 117 and/or the rotation portion 118 of the remote control device 116). FIGS. 2A and 2B depict example message flows for querying for a current status of lighting devices in response to an actuation of a toggle actuator (e.g., the actuation portion 117) and generating lighting control commands in response to the identified status. As shown in FIG. 2A, a remote control device 202 may transmit a status query message 206 for identifying the status of lighting devices, such as lighting devices 204a, 204b (e.g., the lighting devices 112a, 112b, 122). The status query message 206 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 206 may be sent as a multicast message (e.g., as shown in FIG. 2A) or individual unicast messages that are received by the lighting devices 204a, 204b.

The remote control device 202 may receive a response to the status query message 206 from each of the lighting devices 204a, 204b that receive the status query message 206 and/or with which the remote control device 202 is associated. For example, the lighting device 204a may transmit a status response message 208 in response to the status query message 206 that indicates that the lighting device 204a is in the off state. The lighting device 204b may transmit a status response message 210 in response to the status query message 206 that indicates that the lighting device 204b is in the on state. The status response messages may also, or alternatively, indicate a lighting level (e.g., an intensity or brightness), a color (e.g., a color temperature), or other status of the lighting device from which the status message is transmitted.

If the remote control device 202 determines that any of the lighting devices 204a, 204b are in the on state, the remote control device 202 may be configured to transmit a default toggle command, such as the off command 212. The off command 212 may be sent as a multicast message (e.g., as shown in FIG. 2A) or individual unicast messages that are received by the lighting devices 204a, 204b. Though an off command 212 may be transmitted as the default toggle command as shown in FIG. 2A, the remote control device 202 may transmit an on command or another default command in response to identifying a status of one or more of the lighting devices 204a, 204b. The lighting device 204b may turn to the off state in response to receiving the off command 212.

The remote control device 202 may determine the control instructions for being sent to the lighting devices 204a, 204b based on the status of one of the lighting devices 204a, 204b. For example, the remote control device 202 may determine the control instructions for being sent to the lighting devices 204a, 204b based on the status of a master lighting device or a lighting device that is first to respond to the status query message 206. The remote control device 202 may control the state of both of the lighting devices, 204a, 204b to respond to the status query message by sending a command to toggle the lighting devices, or may toggle the other lighting devices in order to synchronize the other devices with the state of the master lighting device or the first lighting device to respond.

As shown in FIG. 2B, the remote control device 202 may respond to the status of the first lighting device 204a, 204b to respond to a status query message. For example, a status query message 220 may be sent as a multicast message (e.g., as shown in FIG. 2B) or a unicast message to each lighting device 204a, 204b. The lighting device 204a may be the first device to receive the status query message 220 and/or from which a status response message 222 is received in response. The status response message 222 may indicate the status of the lighting device 204a, which may cause the remote control device 202 to send the opposite command (e.g., an on command 224). The on command 224 may be sent as a multicast message (e.g., as shown in FIG. 2B) or a unicast message. While not shown in FIG. 2B, the lighting device 204b may be the first device to receive the status query message 220 and/or from which a status response message is received in response. The status response message may indicate the status of the lighting device 204b, which may cause the remote control device 202 to send the opposite command (e.g., the off command 234). The off command 234 may be sent as a multicast message or a unicast message.

Though not shown in FIG. 2B, the remote control device 202 may scan for lighting devices 204a, 204b in a preferred state (e.g., on/off state, lighting intensity, color, etc.). The remote control device 202 may send the status query message as a unicast message to each of the lighting devices 204a, 204b or as a multicast message to both lighting devices 204a, 204b. The remote control device 202 may continue to send a status query message to each of the lighting devices 204a, 204b until one of the lighting devices returns a non-preferred state. For example, remote control device 202 may send the status query message 206 to the lighting device 204a and receive the status response message 208 prior to sending a status query message to the lighting device 204. The remote control device 202 may stop scanning for lighting devices when the remote control device 202 receives a status message from a lighting device that identifies the lighting device as being in a non-preferred state (e.g., state other than the preferred on/off state, lighting intensity, color, etc.), or when the remote control device 202 has scanned each lighting device.

The remote control device 202 may transmit a status query message that requests a response from lighting devices in a particular state. For example, as shown in FIG. 2B, the remote control device 202 may transmit the status query message 220 that requests a response from lighting devices in the off state. The status query message 220 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 220 may be a multicast message (e.g., as shown in FIG. 2B) or individual unicast messages by the lighting devices 204a, 204b with which the remote control device 202 may be associated.

As the lighting device 204a is in the off state, the lighting device 204a may respond with the status response message 222 that indicates that the lighting device 204a is in the off state. The status response message 222 may indicate that the lighting device 204a is in the off state, or the transmission of the status response message 222 itself may indicate that the lighting device 204a is in the off state. As the lighting device 204b is in the on state, the lighting device 204b may be unresponsive to the status query message 220.

The remote control device 202 may receive a response to the status query message 220 from the lighting device 204a and determine that at least one lighting device is in the off state. If the remote control device 202 determines that any of the lighting devices 204a, 204b are in the off state, the remote control device 202 may be configured to transmit a default toggle message, such as the on command 224. The on command 224 may be sent as a multicast message or individual unicast messages that are received by the lighting devices 204a, 204b.

FIG. 2C depicts an example message flow for querying for a current status (e.g., intensity levels) of lighting devices in response to an actuation of an intensity adjustment actuator (e.g., the rotation portion 118) and generating lighting control commands in response to the identified status. As shown in FIG. 2C, the remote control device 202 may transmit a status query message 230 for identifying the intensity level of lighting devices, such as lighting devices 204a, 204b, 204c. The status query message 230 may be transmitted as an initial message (e.g., after awakening from a sleep state) after identifying a user interface event (e.g., actuation, rotation, finger swipe, etc.) and/or a proximity sensing event (e.g., a sensing circuit sensing an occupant near the remote control device 116). The status query message 230 may be sent as a multicast message (e.g., as shown in FIG. 2C) or individual unicast messages that are received by the lighting devices 204a, 204b, 204c.

The remote control device 202 may determine the control instructions for being sent to the lighting devices 204a, 204b, 204c based on the status of one of the lighting devices 204a, 204b, 204c. For example, the remote control device 202 may determine the control instructions for being sent to the lighting devices 204a, 204b, 240c based on the status (e.g., a lighting level) of a first lighting device to respond to the status query message 230 (e.g., lighting device 204a as shown in FIG. 2C). The remote control device 202 may control the lighting levels of all of the lighting devices 204a, 204b, 204c by sending a command to go to a new lighting level that may be determined based on the lighting level of the first lighting device to respond to the status query message 206. For example, the lighting device 204a may transmit a status response message 232 that may indicate that the lighting device 204a is at a lighting level of 50%.

The remote control device 202 use the lighting level of the first lighting device 204a, 204b, 204c to respond to the status query message 230 to control the lighting devices 204a, 204b, 204c. In response to receiving the status response message 232 indicating that the lighting device 204a is at the lighting level of 50%, the remote control device 202 may transmit a command message 240 including a move-to-level command (e.g., a go-to command) to go to a new lighting level $L_{NEW}$ of 60% to the lighting device 204a. The remote control device 202 may then transmit a command message 242 to the lighting device 204b and a command message 244 to the lighting device 204c, where each of the command messages 242, 244 including the same move-to-level command as included in the command message 240 (e.g., to go to the new lighting level $L_{NEW}$ of 60%). The command messages 240, 242, 244 may be transmitted as unicast messages (e.g., as shown in FIG. 2C) or a multicast message. The remote control device 202 may be configured to determine a desired amount of change in the lighting level of the lighting devices 204a, 204b, 204c in response to an amount of rotation of the rotation portion (e.g., a change in an angular position of the rotation portion) since the rotation of the rotation portion first began until the command message 240 is transmitted, and to determine the new lighting level $L_{NEW}$ to which to control the lighting devices 204a, 204b, 204c in response to the desired amount of change in the lighting level.

The remote control device 202 may continue to transmit command messages to the lighting devices 204a, 204b, 204c as the rotation portion is rotated. For example, the remote control device 202 may transmit commands messages 250, 252, 254 to the respective lighting devices 204a, 204b, 204c, where the command messages all include a move-to-level command to go to a new lighting level $L_{NEW}$ of 70%. The command messages 250, 252, 254 may be transmitted as unicast messages (e.g., as shown in FIG. 2C) or a multicast message. The remote control device 202 may be configured to determine the new lighting level $L_{NEW}$ to which to control the lighting devices 204a, 204b, 204c in response to an amount of rotation of the rotation portion since the command message 240 was transmitted until the command message 250 is transmitted. For example, the remote control device 202 may be configured to transmit the commands messages 250, 252, 254 at a transmission interval $T_{TX}$ (e.g., at a transmission frequency fix) while the rotation portion of the remote control device is being rotated. For example, the transmission interval $T_{TX}$ may be a time of approximately 100 milliseconds.

The remote control device 202 may then transmit commands messages 260, 262, 264 to the respective lighting devices 204a, 204b, 204c, where the command messages all include a move-to-level command to go to a new lighting level $L_{NEW}$ of 80%. The command messages 260, 262, 264 may be transmitted as unicast messages (e.g., as shown in FIG. 2C) or a multicast message. The remote control device 202 may be configured to determine the new lighting level $L_{NEW}$ to which to control the lighting devices 204a, 204b, 204c in response to an amount of rotation of the rotation portion since the command message 250 was transmitted until the command message 260 is transmitted.

When there are a large number of lighting devices in a load control system that receive command messages (e.g., via unicast messages) including, for example, move-to-level commands, there may be some latency between when a first lighting device receives a move-to-level command and adjusts to a particular lighting level, and when a final lighting devices receives the move-to-level command (e.g., the same move-to-level command) and adjusts to the same lighting level. This delay in adjustment may result in differences in the lighting levels of the first lighting device and the final lighting device that may not be noticeable to the human eye. However, if a user actuates the rotation portion is a continued and/or excessive manner, for example, by quickly rotating the rotation portion clockwise and counter-clockwise, the lighting devices may be controlled to different levels at different times, which may produce an undesirable visual effect for the user (e.g., differences in lighting levels that may be noticeable to the human eye).

The remote control device 202 may be configured to detect a continued and/or excessive user interaction and reduce the number of command messages that are being transmitted to prevent the lighting devices 204a, 204b, 204c from producing undesirable visual effects. For example, a user interaction with a rotation portion of a remote control device (e.g., the remote control device 202) may be considered a continued user interaction when a rotation of the rotation portion lasts for predetermined period (e.g., ten seconds with less than three-second breaks in the movements). In addition, a user interaction with the rotation portion may be considered an excessive user interaction when a rotation of the rotation portion exceeds, for example, one full rotation per second. An example of a continued and excessive user interaction with the rotation portion may, for example, include when a user actuates the rotation portion by quickly rotating the rotation portion (e.g., rotating the rotation portion at an angular velocity that is greater than a predetermined threshold) clockwise and/or counter-clockwise for a predetermined period of time (e.g., ten seconds). A user interaction that may be continued, but not excessive, may be a slower rotation of the rotation portion (e.g., rotating the rotation portion at an angular velocity that is less than or equal to the predetermined threshold) over predetermined period of time (e.g., ten seconds) to increase the intensities of the lighting devices 204a, 204b, 204c from 0% to 100%. A user interaction that may be excessive, but not continued, may be a quick rotation of the rotation portion over one second to increase the intensities of the lighting devices 204a, 204b, 204c from 0% to 100%.

To detect a continued and/or excessive user interaction of the rotation portion, the remote control device 202 may start a usage timer when a rotation of the rotation portion first begins and decrease the transmission frequency fix when the usage timer exceeds a usage threshold (e.g., approximately 10 seconds). In addition, the remote control device 202 may provide a visible indication by illuminating a visual indicator (e.g., blinking the visual indicator) when the usage timer exceeds the usage threshold to indicate to the user that the remote control device 202 has entered a reduced transmission state. The remote control device 202 may also monitor usage (e.g. angular velocity of rotation) of the rotation portion when the usage timer exceeds the usage threshold to determine if the transmission frequency $f_{TX}$ should be decreased. For example, the remote control device 202 may measure an angular velocity of the rotation portion (e.g., angular distance of rotation over time) when the usage timer exceeds the usage threshold, and determine to decrease the transmission frequency $f_{TX}$ if the angular velocity exceeds an angular velocity threshold. In addition, the remote control device 202 may measure the angular position of the rotation portion when the usage timer exceeds the usage threshold, and determine to decrease the transmission frequency $f_{TX}$ if a change in the angular position of the rotation portion exceeds an angular position change threshold. Further, the remote control device 202 may measure the desired amount of change when the usage timer exceeds the usage threshold, and determine to decrease the transmission frequency fix if the desired amount of change in the lighting level exceeds a lighting level change threshold.

The remote control device 202 may be configured to decrease the transmission frequency $f_{TX}$ by increasing the transmission interval $T_{TX}$ from an initial value $T_{INIT}$ (e.g., approximately 100 milliseconds) to an adjusted value $T_{ADJ}$ (e.g., an increased transmission interval). The adjusted value $T_{ADJ}$ may be, for example, three to four times the initial value $T_{INIT}$ (e.g., approximately 300 to 400 milliseconds). Also, or alternatively, the remote control device 202 may be configured to decrease the transmission frequency $f_{TX}$ to zero Hertz (e.g., such that the remote control device stops transmitting command messages). If the remote control device 202 stops transmitting command messages, the remote control device may transmit a final command message in response to the processor detecting that the rotation (e.g., the continued user interaction) of the rotation portion of the user interface has stopped. The final command message may include a command for adjusting the lighting level based on a final position of the rotation portion.

The remote control device 202 may be configured to decrease the transmission interval $T_{TX}$ from the adjusted value $T_{ADJ}$ back to the initial value $T_{INIT}$ (e.g., to return to a normal transmission state) when the rotation (e.g., the continued user interaction) of the rotation portion has stopped. For example, the remote control device 202 may be configured to decrease the transmission interval $T_{TX}$ back to the initial value $T_{INIT}$ after a timeout period from when the processor detects that the rotation of the rotation portion has stopped. The remote control device 202 may be configured to stop (e.g., pause) the usage timer when the rotation of the rotation portion has stopped and clear the usage timer after a timeout period from when the rotation stopped. An example of a remote control device that uses a usage timer to determine how long a rotation portion has been rotated is described in commonly-assigned in U.S. Pat. No. 10,219,359, issued Feb. 26, 2019, entitled BATTERY-POWERED CONTROL DEVICE, the entire disclosure of which is hereby incorporated by reference.

Figure 3:
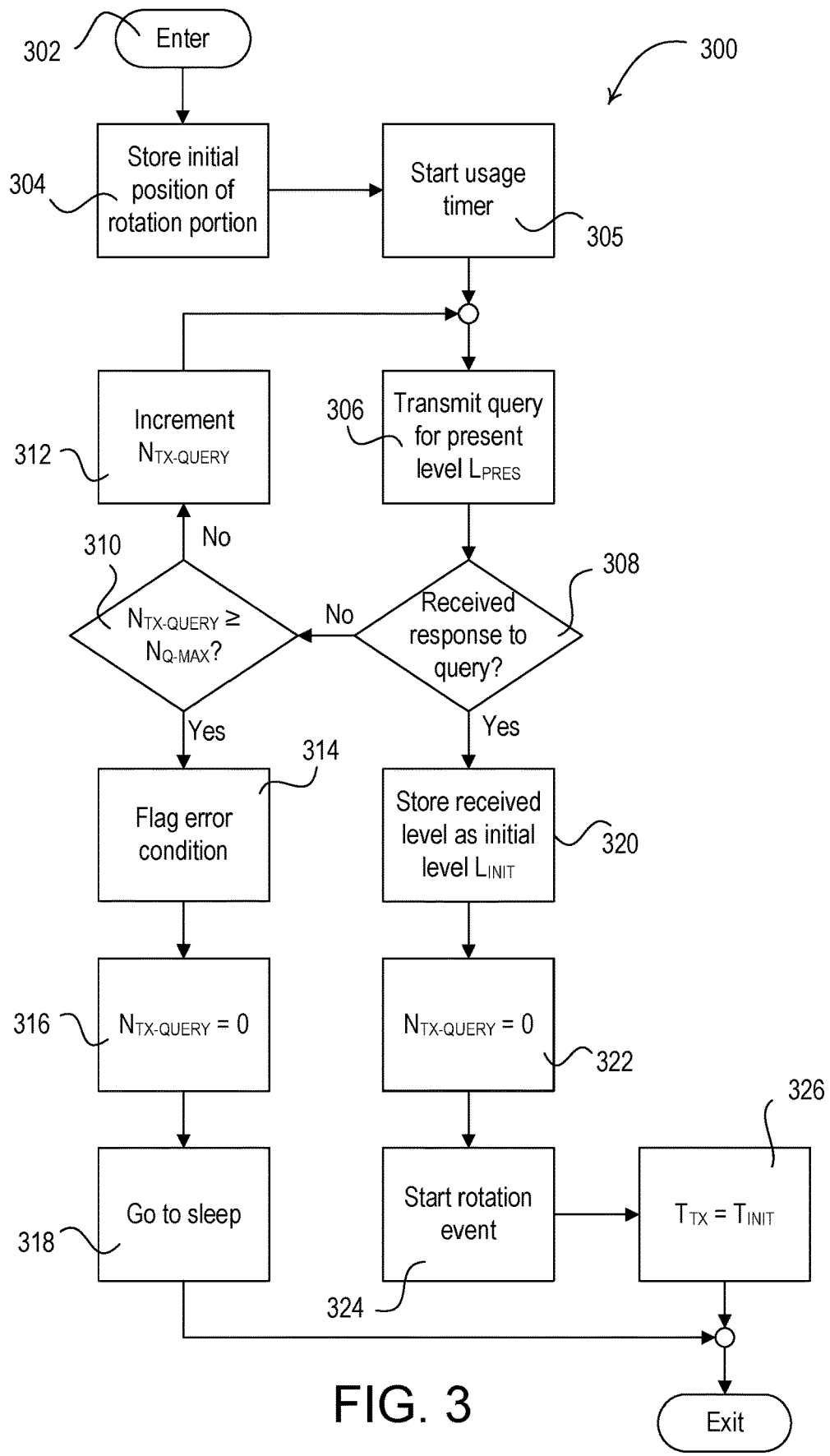
FIG. 3 is a flowchart depicting an example procedure for controlling lighting devices in a load control system.

FIG. 3 is a flowchart depicting an example method 300 for controlling (e.g., adjusting the lighting level of) at least one lighting device in a load control system. The method 300 may be performed at one or more devices in the load control system. For example, the method 300, or portions thereof, may be performed at a remote control device (e.g., the remote control device 116, 202), another controller device (e.g., the remote control device 150, the occupancy sensor 160, the daylight sensor 170, and/or the network device 190), a system controller (e.g., the system controller 180), a master device, a system controller, and/or another computing device. The method 300 may be performed: after awakening from a sleep state; after identifying a user interaction event (e.g., actuation, rotation, finger swipe, etc.); and/or a proximity sensing event (e.g., a sensing circuit sensing an occupant near the remote control device). For example, the method 300 may be executed at 302 by a remote control device in response to a rotation of a rotation portion (e.g., when the rotation portion 118 of the remote control device 116 is first rotated), which may cause the remote control device to wake up. The method 300 may be used by the remote control device to determine an initial state (e.g., an initial lighting level) for a lighting device (e.g., lighting devices 204a, 204b). The method 300 may be executed once when the remote control device wakes up in response to the rotation of the rotation portion.

At 304, an initial position of the rotation portion may be stored. At 305, a usage timer may be started. For example, the usage timer may be initialized to zero seconds and started, counting upwards over time. At 306, a status query message requesting the present lighting level of the lighting device may be transmitted. At 308, a determination may be made as to whether a response (e.g., a status response message) to the status query message has been received. If the response to the status query message fails to be received at 308, a determination may be made as to whether a variable $N_{TX-QUERY}$ is equal to a maximum query value $N_{Q-MAX}$ at 310. The variable $N_{TX-QUERY}$ may indicate the number of query messages that have been transmitted and the maximum query value $N_{Q-MAX}$ may indicate the maximum number of query messages that may be transmitted. If the variable $N_{TX-QUERY}$ is not equal to the maximum query value $N_{Q-MAX}$ at 310, the variable $N_{TX-QUERY}$ may be incremented at 312 and another status query message for querying for the present lighting level of the lighting device may be transmitted at 306. If, at 310, the variable $N_{TX-QUERY}$ is equal to the maximum query value $N_{Q-MAX}$ (e.g., the number of status queries transmitted is equal to the maximum number of queries that may be transmitted), an error flag may be set at 314 to indicate an error condition. At 316, the variable $N_{TX-QUERY}$ may be set (e.g., reset) to zero and, at 318, the device performing the method 300 may enter a sleep state, before the method 300 exits. In addition, the device may stop and/or clear the usage timer when entering the sleep state at 318.

If the response to the query message has been received at 308, the received lighting level may be stored as an initial lighting level $L_{INIT}$ at 320. At 322, the variable $N_{TX-QUERY}$ may be set to zero. At 324, a rotation event may be started. For example, a rotation event may start when rotation of the rotation portion begins (e.g., when the remote control device wakes-up) and the rotation event may end when the rotation portion has not been rotated for a predefined period of time. During the rotation event, the remote control device may periodically transmit command messages (e.g., move-to-level command messages) to the lighting device (e.g., during method 400 described below with reference to FIG. 4). At 326, the transmission interval $T_{TX}$ may be set to an initial value $T_{INIT}$ (e.g., to prepare for execution of the method 400).

Figure 4:
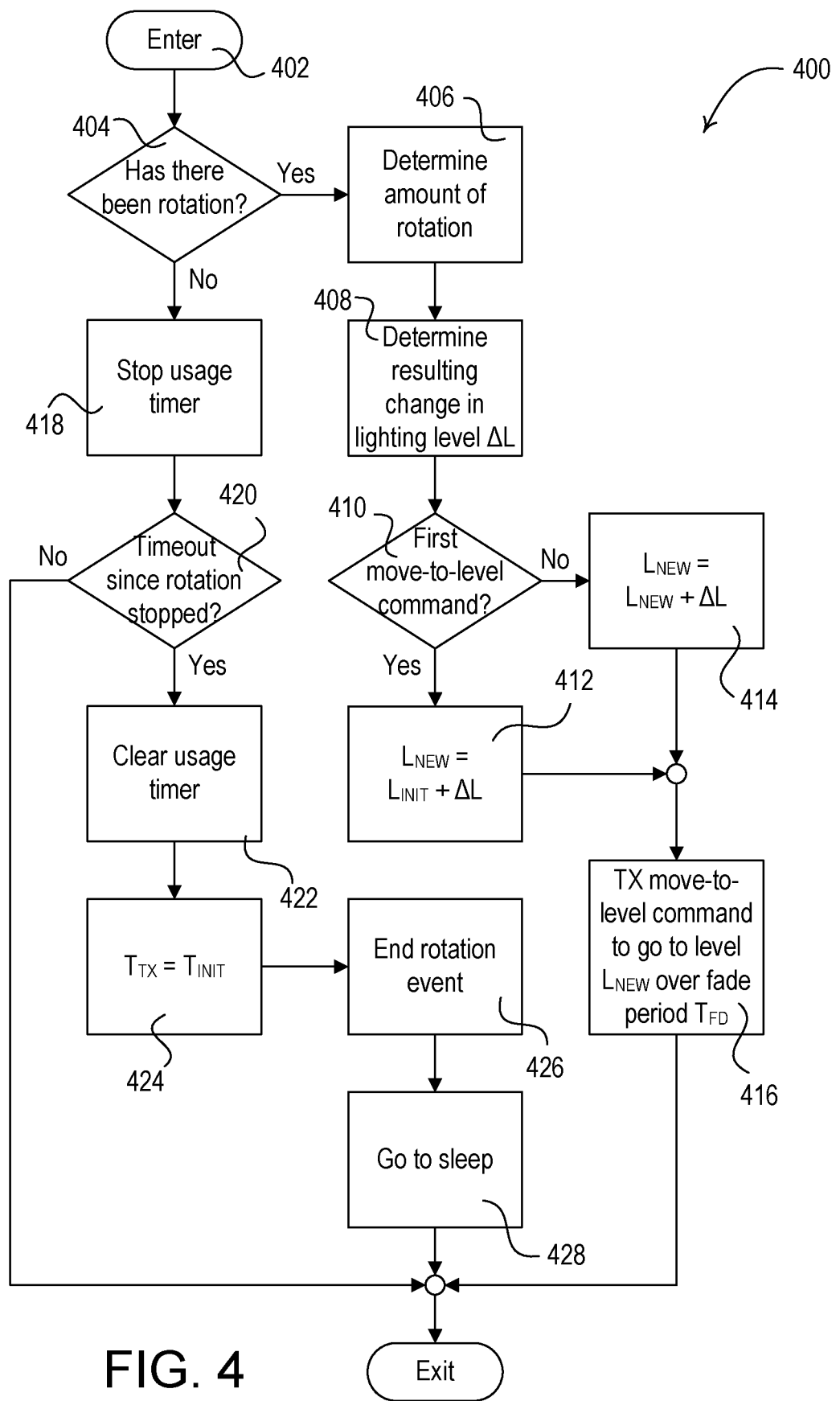
FIG. 4 is another flowchart depicting an example procedure for controlling lighting devices in a load control system.

FIG. 4 is a flowchart depicting an example method 400 for controlling (e.g., adjusting the lighting level of) at least one lighting device in a load control system. The method 400 may be performed at one or more devices in the load control system. For example, the method 400, or portions thereof, may be performed at a remote control device (e.g., the remote control device 116, 202), another controller device (e.g., the remote control device 150, the occupancy sensor 160, the daylight sensor 170, and/or the network device 190), a system controller (e.g., the system controller 180), a master device, a system controller, and/or another computing device. The method 400 may be performed: after awakening from a sleep state; after identifying a user event (e.g., actuation, rotation, finger swipe, etc.); and/or a proximity sensing event (e.g., a sensing circuit sensing an occupant near the remote control device). For example, the method 400 may be executed periodically at 402 by a remote control device during a rotation event (e.g., which may be started at 324 of the method 300). The method 400 may be used by the remote control device to transmit command messages (e.g., move-to-level command messages and repeat command messages) to control the lighting level of the lighting device during the rotation event. The method 400 may be executed periodically at the repeat interval $T_{RP}$ (e.g., half of the transmission interval $T_{TX}$) until the device returns to a sleep state.

At 404, a determination may be made as to whether rotation of the rotation portion (e.g., rotation of the rotation portion 118 of the remote control device 116) has occurred. For example, when the method 400 is first executed after the rotation event has started, a determination may be made at 404 as to whether rotation of the rotation portion has occurred since an initial position (e.g., an initial angular position) of the knob is stored at 304 of the method 300 shown in FIG. 3. When the method 400 is subsequently executed during the rotation event, a determination may be made at 404 as to whether rotation of the rotation portion has occurred within the last transmission interval $T_{TX}$. If there has been rotation of the rotation portion at 404, the amount of rotation of the rotation portion (e.g., a change in an angular portion of the rotation portion) may be determined at 406. For example, when the method 400 is first executed after the rotation event has started, the amount of rotation of the rotation portion since the initial position of the knob (e.g., stored at 304 of the method 300) may be determined at 406. When the method 400 is subsequently executed during the rotation event, the amount of rotation of the rotation portion within the last transmission interval $T_{TX}$ (e.g., since the beginning of the last transmission interval $T_{TX}$) may be determined at 406. At 408, a change ΔL in the lighting level due to the amount of rotation may be determined based on the amount of rotation within the last transmission interval $T_{TX}$.

A lighting level $L_{NEW}$ (e.g., to which to control the lighting device) for a next move-to-level command message may be determined based on the determined change ΔL in the lighting level. For example, if a first move-to-level command message to be transmitted as part of the rotation event at 410, the lighting level $L_{NEW}$ may be set equal to an initial intensity $L_{INIT}$ (e.g., as determined at 320 of the method 300) plus the determined change ΔL in the lighting level at 412. If the move-to-level command is not the first move-to-level command message to be transmitted as part of the rotation event at 410, the lighting level $L_{NEW}$ may be set equal to the previous lighting level $L_{NEW}$ (e.g., the lighting level $L_{NEW}$ transmitted as part of the previous move-to-level command) plus the determined change ΔL in the lighting level at 414. At 416, a move-to-level command message may be transmitted. For example, the move-to-level command message may include the lighting level $L_{NEW}$ and a fade period $T_{FD}$. As described herein, the fade period $T_{FD}$ may be the amount of time over which to transition to the new lighting level $L_{NEW}$. The fade period $T_{FD}$ may be a period of time that is longer that the transmission interval $T_{TX}$. The fade period $T_{FD}$ may be the same each time that the move-to-level command is transmitted.

If there has not been rotation of the rotation portion at 404 (e.g., within the last transmission interval $T_{TX}$), the usage timer may be stopped (e.g., paused) at 418. At 420, a determination may be made as to whether a timeout period since the rotation stopped has expired (e.g., approximately a one to three seconds). If the timeout period has not expired at 420, the method 400 may exit. If the timeout period has expired at 420, the usage timer may be cleared (e.g., set to zero seconds) at 422. At 424, the transmission interval $T_{TX}$ may return (e.g., decreased) to the initial value $T_{INIT}$. The rotation event may end at 426 and the device may enter a sleep state at 428, before the method 400 exits.

Figure 5:
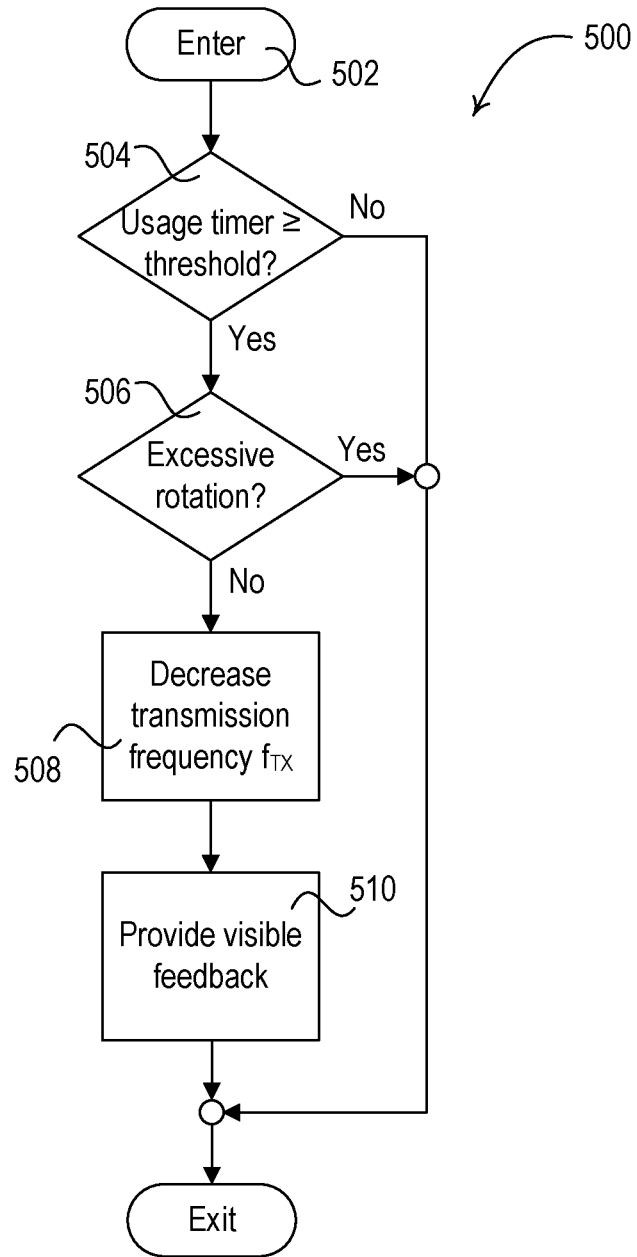
FIG. 5 is yet another flowchart depicting an example procedure for controlling lighting devices in a load control system.

FIG. 5 is a flowchart depicting an example method 500 for detecting an excessive user interaction of a user interface of a remote control device (e.g., the remote control device 116, 202) for controlling at least one lighting device in a load control system. The method 500 may be performed at one or more devices in the load control system. For example, the method 500, or portions thereof, may be performed at the remote control device, another controller device (e.g., the remote control device 150, the occupancy sensor 160, the daylight sensor 170, and/or the network device 190), a system controller (e.g., the system controller 180), a master device, a system controller, and/or another computing device. The method 500 may be performed: after awakening from a sleep state; after identifying a user event (e.g., actuation, rotation, finger swipe, etc.); and/or a proximity sensing event (e.g., a sensing circuit sensing an occupant near the remote control device). For example, the method 500 may be executed periodically at 502 by the remote control device during a rotation event (e.g., which may be started at 324 of the method 300). The method 500 may be performed by the remote control device to detect an excessive user interaction of the user interface of the remote control device.

At 504, a determination may be made as to whether the value of the usage timer (e.g., that was started at 305 of the method 300) has exceed a usage threshold (e.g., approximately ten seconds). If the value of the usage timer has not exceeded the usage threshold at 504, the method 500 may exit. If the value of the usage timer has exceeded the usage threshold at 504, a determination made be made as to whether excessive rotation (e.g., an excessive user interaction) has been detected at 506. For example, excessive rotation may be detected at 506 by measuring the angular velocity of the rotation portion and determining if the angular velocity exceeds an angular velocity threshold. Excessive rotation may also or alternatively be detected at 506 by determining if a change in the angular position of the rotation portion exceeds an angular position change threshold. Further, excessive rotation may be detected at 506 by determining if the desired amount of change in the lighting level (e.g., as determined at 408 of the method 400) exceeds a lighting level change threshold. If an excessive rotation is not detected at 506, the method 500 may exit.

If an excessive rotation is detected at 506, the transmission frequency fix may be decreased (e.g., by increasing the transmission interval $T_{TX}$) at 508. For example, the transmission frequency $f_{TX}$ may be decreased at 508 by increasing the transmission interval $T_{TX}$ from the initial value $T_{INIT}$ (e.g., approximately 100 milliseconds) to an adjusted value $T_{ADJ}$ (e.g., an increased transmission interval), which may be, for example, three to four times the initial value $T_{INIT}$ (e.g., approximately 300 to 400 milliseconds). Also or alternatively, the transmission frequency $f_{TX}$ may be decreased to zero Hertz at 508, such that the remote control device stops transmitting command messages (e.g., stops executing the method 400 shown in FIG. 4). While not shown in FIG. 4, if the transmission frequency $f_{TX}$ is decreased to zero Hertz, the remote control device may transmit a final command message in response to detecting that the rotation of the rotation portion of the user interface has stopped for a timeout period (e.g., rotation is not detected at 404 and the timeout period has expired at 420 of the method 400). The final command message may include a command for adjusting the lighting level of the lighting device based on a final position of the rotation portion. At 510, visible feedback may be provided to a user, before the method 500 exits. For example, the remote control device may illuminate a visual indicator (e.g., by blinking the visual indicator) at 510 to indicate to the user that the value of the transmission interval $T_{TX}$ has been set (e.g., increased) to the adjusted value $T_{ADJ}$.

Figure 6:
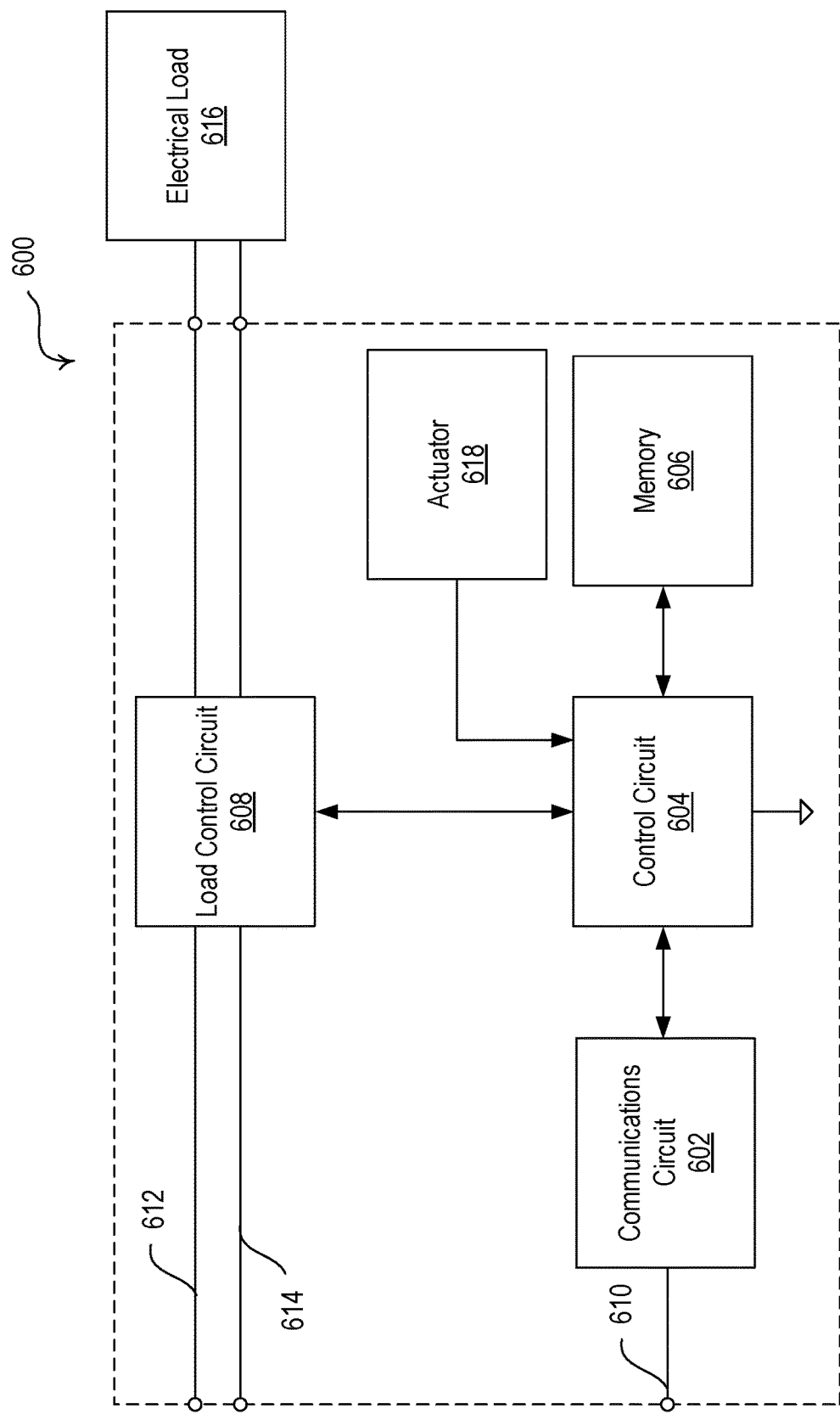
FIG. 6 is a block diagram of an example load control device.

FIG. 6 is a block diagram illustrating an example load control device, e.g., a load control device 600, as described herein. The load control device 600 may be a dimmer switch, an electronic switch, a lighting device (e.g., a light bulb, an electronic ballast for lamps, an LED driver for LED light sources, etc.), an AC plug-in load control device for controlling a plugged electrical load, a controllable electrical receptacle, a temperature control device (e.g., a thermostat), a motor drive unit for a motorized window treatment, a motor drive unit for a fan (e.g., ceiling fan), an audio device (e.g., a controllable speaker or playback device), an appliance, a security camera device, or other load control device. The load control device 600 may include a communications circuit 602. The communications circuit 602 may include a receiver, an RF transceiver, or other communications module capable of performing wired and/or wireless communications via communications link 610. The communications circuit 602 may be in communication with a control circuit 604. The control circuit 604 may include one or more general purpose processors, special purpose processors, conventional processors, digital signal processors (DSPs), microprocessors, integrated circuits, a programmable logic device (PLD), application specific integrated circuits (ASICs), or the like. The control circuit 604 may perform signal coding, data processing, power control, input/output processing, or any other functionality that enables the load control device 600 to perform as described herein.

The control circuit 604 may store information in and/or retrieve information from the memory 606. For example, the memory 606 may maintain a registry of associated control devices and/or control configuration instructions. The memory 606 may include a non-removable memory and/or a removable memory. The load control circuit 608 may receive instructions from the control circuit 604 and may control the electrical load 616 based on the received instructions. The load control circuit 608 may send status feedback to the control circuit 604 regarding the status of the electrical load 616. The load control circuit 608 may receive power via the hot connection 612 and the neutral connection 614 and may provide an amount of power to the electrical load 616. The electrical load 616 may include any type of electrical load.

The control circuit 604 may be in communication with an actuator 618 (e.g., one or more buttons) that may be actuated by a user to communicate user selections to the control circuit 604. For example, the actuator 618 may be actuated to put the control circuit 604 in an association mode and/or communicate association messages from the load control device 600.

Figure 7:
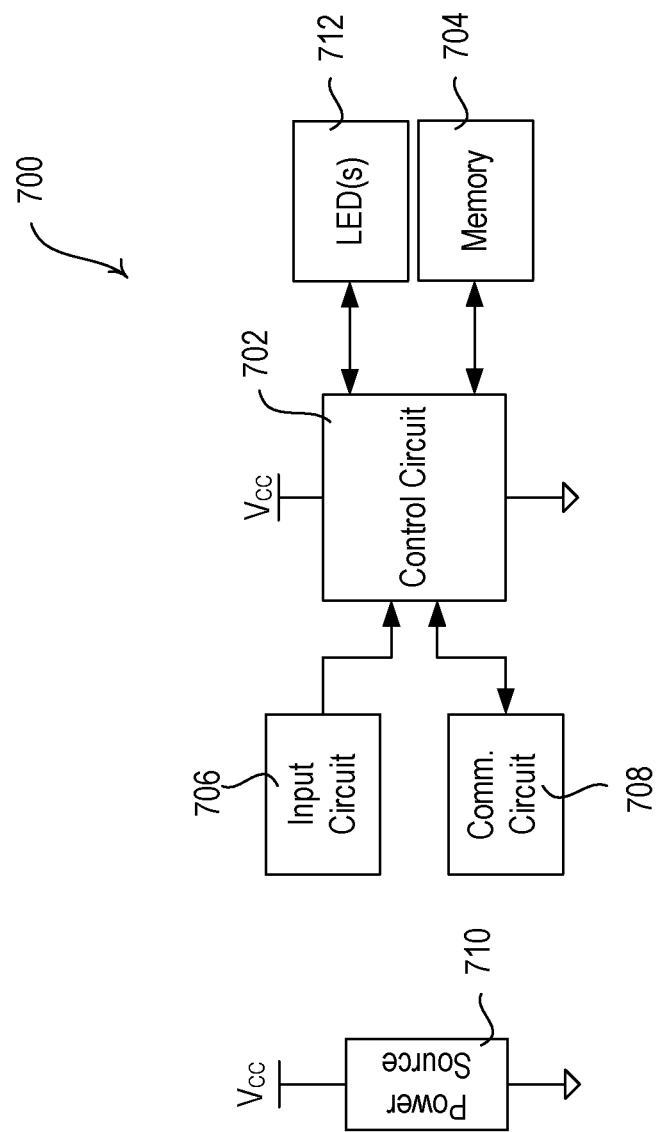
FIG. 7 is a block diagram of an example controller device.

FIG. 7 is a block diagram illustrating an example controller device 700 as described herein. The controller device 700 may be a remote control device, an occupancy sensor, a daylight sensor, a window sensor, a temperature sensor, and/or the like. The controller device 700 may include a control circuit 702 for controlling the functionality of the controller device 700. The control circuit 702 may include one or more general purpose processors, special purpose processors, conventional processors, digital signal processors (DSPs), microprocessors, integrated circuits, a programmable logic device (PLD), application specific integrated circuits (ASICs), or the like. The control circuit 702 may perform signal coding, data processing, power control, input/output processing, and/or any other functionality that enables the controller device 700 to perform as described herein.

The control circuit 702 may store information in and/or retrieve information from the memory 704. The memory 704 may include a non-removable memory and/or a removable memory, as described herein.

The controller device 700 may include one or more light sources, such as one or more LEDs 712, for providing feedback to a user. The one or more LEDs 712 may be included in a status indicator and may be controlled by the control circuit 702. The control circuit 702 may control the LEDs 712 as described herein to provide feedback to the user.

The controller device 700 may include a communications circuit 708 for transmitting and/or receiving information. The communications circuit 708 may transmit and/or receive information via wired and/or wireless communications. The communications circuit 708 may include a transmitter, an RF transceiver, or other circuit capable of performing wired and/or wireless communications. The communications circuit 708 may be in communication with control circuit 702 for transmitting and/or receiving information.

The control circuit 702 may also be in communication with an input circuit 706. The input circuit 706 may include an actuator (e.g., one or more buttons), a rotating or sliding portion, or a sensor circuit (e.g., an occupancy sensor circuit, a daylight sensor circuit, or a temperature sensor circuit) for receiving input that may be sent to a device for controlling an electrical load. The input circuit 706 may also comprise a proximity sensing circuit for sensing an occupant in the vicinity of the controller device 700. For example, the controller device 702 may receive input from the input circuit 706 to put the control circuit 702 in an association mode and/or communicate association messages from the controller device 700. The control circuit 702 may receive information from the input circuit 706 (e.g. an indication that a button has been actuated, a rotation portion has been rotated, or information has been sensed) and/or an indication of a proximity sensing event. The input circuit 706 may comprise an actuator (e.g., a mechanical tactile switch) configured be actuated as an on/off event (e.g., in response to an actuation of the actuation portion 117). The input circuit 706 may also comprise a rotational position sensing circuit (e.g., a magnetic sensing circuit, such as a Hall effect sensing circuit) for sensing rotations (e.g., the angular position and/or direction of rotation) of a rotation portion (e.g., the rotation portion 118). Each of the modules within the controller device 700 may be powered by a power source 710.

Figure 8:
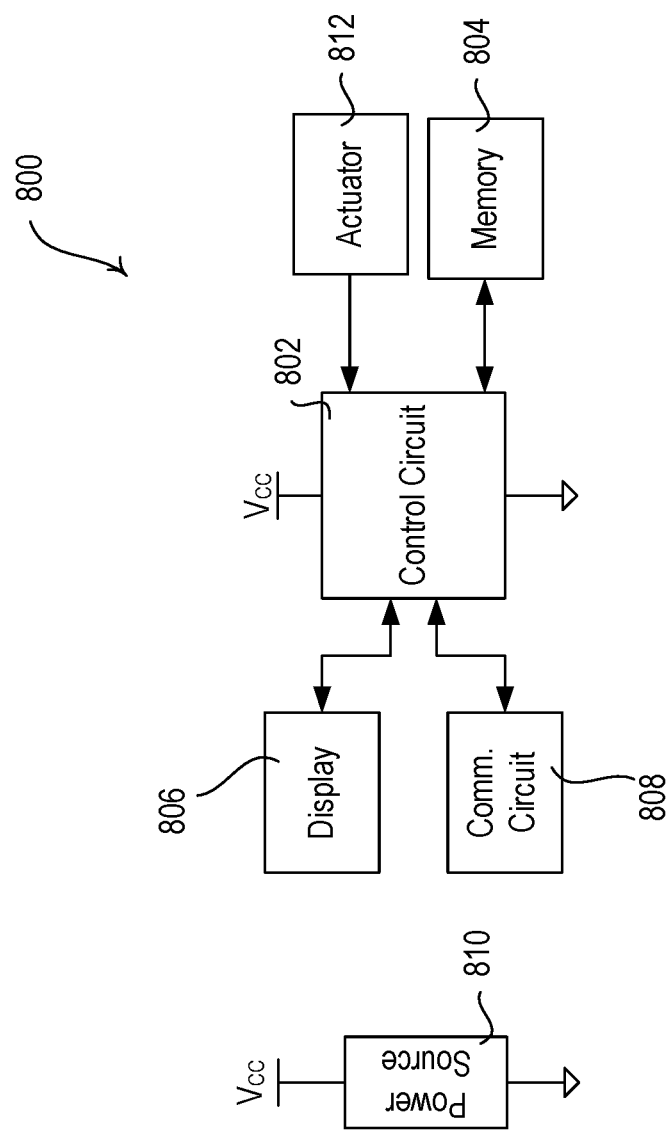
FIG. 8 is a block diagram of an example network device.

FIG. 8 is a block diagram illustrating an example network device 800 as described herein. The network device 800 may include the network device 190, for example. The network device 800 may include a control circuit 802 for controlling the functionality of the network device 800. The control circuit 802 may include one or more general purpose processors, special purpose processors, conventional processors, digital signal processors (DSPs), microprocessors, integrated circuits, a programmable logic device (PLD), application specific integrated circuits (ASICs), or the like. The control circuit 802 may perform signal coding, data processing, power control, input/output processing, or any other functionality that enables the network device 800 to perform as described herein. The control circuit 802 may store information in and/or retrieve information from the memory 804. The memory 804 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 800 may include a communications circuit 808 for transmitting and/or receiving information. The communications circuit 808 may perform wireless and/or wired communications. The communications circuit 808 may include an RF transceiver or other circuit capable of performing wireless communications via an antenna. Communications circuit 808 may be in communication with control circuit 802 for transmitting and/or receiving information.

The control circuit 802 may also be in communication with a display 806 for providing information to a user. The control circuit 802 and/or the display 806 may generate GUIs for being displayed on the network device 800. The display 806 and the control circuit 802 may be in two-way communication, as the display 806 may include a touch screen module capable of receiving information from a user and providing such information to the control circuit 802. The network device may also include an actuator 812 (e.g., one or more buttons) that may be actuated by a user to communicate user selections to the control circuit 802.

Each of the modules within the network device 800 may be powered by a power source 810. The power source 810 may include an AC power supply or DC power supply, for example. The power source 810 may generate a supply voltage $V_{CC}$ for powering the modules within the network device 800.

Figure 9:
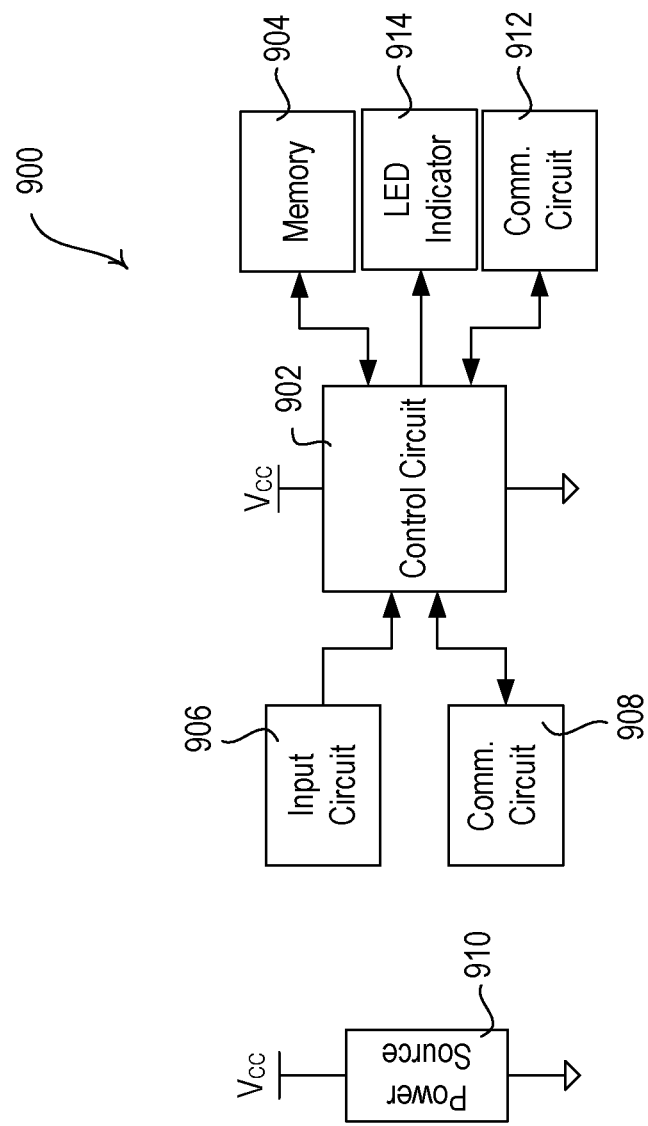
FIG. 9 is a block diagram of an example system controller (e.g., a hub device).

FIG. 9 is a block diagram illustrating an example system controller 900 (e.g., a hub device) as described herein. The system controller 900 may include a control circuit 902 for controlling the functionality of the system controller 900. The control circuit 902 may include one or more general purpose processors, special purpose processors, conventional processors, digital signal processors (DSPs), microprocessors, integrated circuits, a programmable logic device (PLD), application specific integrated circuits (ASICs), or the like. The control circuit 902 may perform signal coding, data processing, power control, input/output processing, or any other functionality that enables the system controller 900 to perform as described herein. The control circuit 902 may store information in and/or retrieve information from the memory 904. The memory 904 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 900 may include a communications circuit 908 for transmitting and/or receiving information. The communications circuit 908 may perform wireless and/or wired communications. The system controller 900 may also, or alternatively, include a communications circuit 912 for transmitting and/or receiving information. The communications circuit 912 may perform wireless and/or wired communications. Communications circuits 908 and 912 may be in communication with control circuit 902. The communications circuits 908 and 912 may include RF transceivers or other communications modules capable of performing wireless communications via an antenna. The communications circuit 908 and communications circuit 912 may be capable of performing communications via the same communication channels or different communication channels. For example, the communications circuit 908 may be capable of communicating (e.g., with a network device, over a network, etc.) via a wireless communication channel and the communications circuit 912 may be capable of communicating (e.g., with control devices and/or other devices in the load control system) via another wireless communication channel.

The control circuit 902 may be in communication with an LED indicator 914 for providing indications to a user. The control circuit 902 may be in communication with an actuator 906 (e.g., one or more buttons) that may be actuated by a user to communicate user selections to the control circuit 902. For example, the actuator 906 may be actuated to put the control circuit 902 in an association mode and/or communicate association messages from the system controller 900.

Each of the modules within the system controller 900 may be powered by a power source 910. The power source 910 may include an AC power supply or DC power supply, for example. The power source 910 may generate a supply voltage $V_{CC}$ for powering the modules within the system controller 900.

Although features and elements are described herein in particular combinations, each feature or element can be used alone or in any combination with the other features and elements. For example, the functionality described herein may be described as being performed by a control device, such as a remote control device or a lighting device, but may be similarly performed by a system controller or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:
1. A remote control device, comprising:
a user interface that comprises a rotation portion; and
a processor, configured to:

receive an indication of a rotation of the rotation portion via the user interface;
start a usage timer in response to receiving the indication of the rotation of the rotation portion;
periodically transmit command messages at a transmission frequency while the rotation portion is being rotated, each of the command messages comprising a respective command for adjusting to a respective lighting level; and
decrease the transmission frequency of the periodically transmitted command messages in response a continued user interaction, wherein the continued user interaction occurs when the usage timer exceeding a usage threshold.

2. The remote control device of claim 1, wherein each of the command messages are periodically transmitted at a transmission interval that is dependent on the transmission frequency, and wherein the transmission interval is a period of time between when each of the command messages are periodically transmitted.

3. The remote control device of claim 2, wherein the processor is configured to determine the respective lighting level of the respective command of each of the commands messages in response to an amount of change in an angular position of the rotation portion during the transmission interval.

4. The remote control device of claim 3, wherein the processor is further configured to:
determine that there is excessive usage of the rotation portion when the usage timer exceeds a second usage threshold, and
decrease the transmission frequency based on the determination that there is excessive usage of the rotation portion.

5. The remote control device of claim 4, wherein the processor further is configured to determine that there is excessive usage of the rotation portion when an angular velocity of the rotation portion exceeds an angular velocity threshold and the usage timer exceeds the usage threshold.

6. The remote control device of claim 4, wherein the processor is further configured to determine that there is excessive usage of the rotation portion when a change in the angular position of the rotation portion exceeds an angular position change threshold and the usage timer exceeds the usage threshold.

7. The remote control device of claim 4, wherein the processor is further configured to:
determine a desired amount of change in a lighting level based on the determined amount of change in the angular position of the rotation portion, and
determine that there is excessive usage of the rotation portion when the change in the lighting level exceeds a lighting level change threshold and the usage timer exceeds the usage threshold.

8. The remote control device of claim 2, wherein the processor is further configured to detect when the continued user interaction of the user interface has stopped and decrease the value of the transmission interval to an initial value based on the processor detecting that the continued user interaction of the user interface has stopped, wherein decreasing the value of the transmission interval increases the transmission frequency.

9. The remote control device of claim 8, wherein the processor is further configured to increase the transmission interval to the initial value after a timeout period from when the processor detects that the continued user interaction of the user interface has stopped.

10. The remote control device of claim 1, wherein the processor is configured to reduce the transmission frequency to zero hertz, such that the processor stops periodically transmitting the commands messages.

11. The remote control device of claim 2, wherein the processor is configured to detect when the continued user interaction of the user interface has stopped, and transmit a final command message in response to the processor detecting that the continued user interaction of the user interface has stopped, where the final command message includes a command for adjusting to the lighting level based on a final position of the user interaction.

12. The remote control device of claim 1, wherein the processor is configured to periodically transmit the command messages at a transmission interval that is dependent upon the transmission frequency, and to reduce the transmission frequency by increasing the transmission interval from an initial value to an increased value.

13. The remote control device of claim 1, wherein the user interface comprises a visual indicator, and the processor is configured to illuminate the visual indicator in response to the usage timer exceeding a usage threshold.

14. A remote control device, comprising:
a user interface; and
a processor, configured to:
receive an indication of a user interaction via the user interface;
start a usage timer in response to receiving the indication of the user interaction;
periodically transmit command messages at a transmission frequency in response to a continued user interaction, each of the command messages comprising a respective command for adjusting to a respective lighting level, wherein the continued user interaction occurs when the usage timer exceeds a first usage threshold;
determine that there is excessive usage of the user interface when the usage timer exceeds a second usage threshold; and
decrease the transmission frequency at which command messages are periodically transmitted after the usage timer exceeds the first usage threshold and the excessive usage of the user interface is determined.

15. The remote control device of claim 14, wherein the user interface comprises a rotation portion, and wherein each of the command messages are periodically transmitted at a transmission interval that is dependent on the transmission frequency while the rotation portion is being rotated.

16. The remote control device of claim 15, wherein the processor is further configured to determine the respective lighting level of the respective command of each of the commands messages in response to an amount of change in an angular position of the rotation portion during the transmission interval.

17. The remote control device of claim 16, wherein the processor is further configured to determine that there is excessive usage of the rotation portion by determining when an angular velocity of the rotation portion exceeds an angular velocity threshold and the usage timer exceeds the usage threshold.

18. The remote control device of claim 16, wherein the processor is further configured to determine that there is excessive usage of the rotation portion when a change in the angular position of the rotation portion exceeds an angular position change threshold and the usage timer exceeds the usage threshold.

19. The remote control device of claim 16, wherein the processor is further configured to:
  determine a desired amount of change in a lighting level based on the determined amount of change in the angular position of the rotation portion, and
  determine that there is excessive usage of the rotation portion when the change in the lighting level exceeds a lighting level change threshold and the usage timer exceeds the usage threshold.

20. A remote control device, comprising:
a user interface; and
a processor, configured to:
  receive an indication of a user interaction via the user interface;
  start a usage timer in response to receiving the indication of the user interaction;
  periodically transmit command messages at a transmission interval in response to a continued user interaction, each of the command messages comprising a respective command for adjusting to a respective lighting level; and
  stop periodically transmitting the command messages in response to the usage timer exceeding a usage threshold.

21. The remote control device of claim 20, wherein the processor is further configured to detect that the continued user interaction of the user interface has stopped, and transmit a final command message based on detecting that the continued user interaction of the user interface has stopped, wherein the final command message includes a command for adjusting to the lighting level based on a final position of the user interaction.

22. A non-transitory computer readable medium having instructions stored thereon that when executed by at least one control circuit direct the at least one control circuit to:
  receive an indication of a rotation of a rotation portion;
  start a usage timer in response to receiving the indication of the rotation of the rotation portion;
  periodically transmit command messages at a transmission frequency while the rotation portion is being rotated, each of the command messages comprising a respective command for adjusting to a respective lighting level; and
  decrease the transmission frequency of the periodically transmitted command messages in response to a continued user interaction, wherein the continued user interaction occurs when the usage timer exceeding a usage threshold.

23. The non-transitory computer readable medium of claim 22, wherein the control instructions are further configured to direct the at least one control circuit to periodically transmit each of the command messages at a transmission interval that is dependent on the transmission frequency, and wherein the transmission interval is a period of time between when each of the command messages are periodically transmitted.

24. The non-transitory computer readable medium of claim 23, wherein the instructions, when executed by the at least one control circuit, further direct the at least one control circuit to determine the respective lighting level of the respective command of each of the command messages in response to an amount of change in an angular position of the rotation portion during the transmission interval.

25. The non-transitory computer readable medium of claim 24, wherein the instructions, when executed by the at least one control circuit, further direct the at least one control circuit to:
  determine that there is excessive usage of the rotation portion when the usage timer exceeds a second usage threshold, and
  decrease the transmission frequency based on the determination that there is excessive usage of the rotation portion.

26. The non-transitory computer readable medium of claim 25, wherein the instructions, when executed by the at least one control circuit, further direct the at least one control circuit to determine that there is excessive usage of the rotation portion when an angular velocity of the rotation portion exceeds an angular velocity threshold and the usage timer exceeds the usage threshold.

27. The non-transitory computer readable medium of claim 25, wherein the instructions, when executed by the at least one control circuit, further direct the at least one control circuit to determine that there is excessive usage of the rotation portion when a change in the angular position of the rotation portion exceeds an angular position change threshold and the usage timer exceeds the usage threshold.

28. The non-transitory computer readable medium of claim 25, wherein the instructions, when executed by the at least one control circuit, further direct the at least one control circuit to:
  determine a desired amount of change in a lighting level based on the determined amount of change in the angular position of the rotation portion, and
  determine that there is excessive usage of the rotation portion when the change in the lighting level exceeds a lighting level change threshold and the usage timer exceeds the usage threshold.

29. The non-transitory computer readable medium of claim 23, wherein the instructions, when executed by the at least one control circuit, further direct the at least one control circuit to detect when the continued user interaction of the user interface has stopped and decrease the value of the transmission interval to an initial value based on the control circuit detecting that the continued user interaction of the user interface has stopped, wherein decreasing the value of the transmission interval increases the transmission frequency.

30. The non-transitory computer readable medium of claim 29, wherein the instructions, when executed by the at least one control circuit, further direct the at least one control circuit to increase the transmission interval to the initial value after a timeout period from when the control circuit detects that the continued user interaction of the user interface has stopped.

31. A non-transitory computer readable medium having instructions stored thereon that, when executed by at least one control circuit, direct the at least one control circuit to:
  receive an indication of a user interaction;
  start a usage timer in response to receiving the indication of the user interaction;
  periodically transmit command messages at a transmission frequency in response to a continued user interaction, each of the command messages comprising a respective command for adjusting to a respective lighting level, wherein the continued user interaction occurs when the usage timer exceeds a first usage threshold;
  determine that there is excessive usage of the user interface when the usage timer exceeds a second usage threshold; and
  decrease the transmission frequency at which command messages are periodically transmitted after the usage timer exceeds the first usage threshold and the excessive usage of the user interface is determined.

32. The non-transitory computer readable medium of claim 31, wherein each of the command messages are periodically transmitted at a transmission interval that is dependent on the transmission frequency.

33. The non-transitory computer readable medium of claim 32, wherein the instructions, when executed by the at least one control circuit, further direct the at least one control circuit to determine the respective lighting level of the respective command of each of the commands messages in response to an amount of change in an angular position of a rotation portion during the transmission interval.

34. The non-transitory computer readable medium of claim 32, wherein the instructions, when executed by the at least one control circuit, further direct the at least one control circuit to:
determine a desired amount of change in a lighting level based on the determined amount of change in the angular position of a rotation portion, and
determine that there is excessive usage of the rotation portion when the change in the lighting level exceeds a lighting level change threshold and the usage timer exceeds the usage threshold.

35. A non-transitory computer readable medium having instructions stored thereon that, when executed by at least one control circuit, direct the at least one control circuit to:
receive an indication of a user interaction;
start a usage timer in response to receiving the indication of the user interaction;
periodically transmit command messages at a transmission interval in response to a continued user interaction, each of the command messages comprising a respective command for adjusting to a respective lighting level; and
stop periodically transmitting the command messages in response to the usage timer exceeding a usage threshold.

36. The non-transitory computer readable medium of claim 35, wherein the instructions, when executed by the at least one control circuit, further direct the at least one control circuit to detect that the continued user interaction of the user interface has stopped, and transmit a final command message based on detecting that the continued user interaction of the user interface has stopped, wherein the final command message includes a command for adjusting to the lighting level based on a final position of the user interaction.

37. A method comprising:
receiving an indication of a rotation of a rotation portion;
starting a usage timer in response to receiving the indication of the rotation of the rotation portion;
periodically transmitting command messages at a transmission frequency while the rotation portion is being rotated, each of the command messages comprising a respective command for adjusting to a respective lighting level; and
decreasing the transmission frequency of the periodically transmitted command messages in response a continued user interaction, wherein the continued user interaction occurs when the usage timer exceeding a usage threshold.

38. The method of claim 37, wherein each of the command messages are periodically transmitted at a transmission interval that is dependent on the transmission frequency, and wherein the transmission interval is a period of time between when each of the command messages are periodically transmitted.

39. The method of claim 38, further comprising determining the respective lighting level of the respective command of each of the commands messages in response to an amount of change in an angular position of the rotation portion during the transmission interval.

40. The method of claim 39, further comprising:
determining that there is excessive usage of the rotation portion when the usage timer exceeds a second usage threshold; and
decreasing the transmission frequency based on the determination that there is excessive usage of the rotation portion.

41. The method of claim 40, further comprising determining that there is excessive usage of the rotation portion when an angular velocity of the rotation portion exceeds an angular velocity threshold and the usage timer exceeds the usage threshold.

42. The method of claim 40, further comprising determining that there is excessive usage of the rotation portion when a change in the angular position of the rotation portion exceeds an angular position change threshold and the usage timer exceeds the usage threshold.

43. The method of claim 40, further comprising:
determining a desired amount of change in a lighting level based on the determined amount of change in the angular position of the rotation portion; and
determining that there is excessive usage of the rotation portion when the change in the lighting level exceeds a lighting level change threshold and the usage timer exceeds the usage threshold.

44. The method of claim 38, further comprising detecting when the continued user interaction of the user interface has stopped and decrease the value of the transmission interval to an initial value based on the control circuit detecting that the continued user interaction of the user interface has stopped, wherein decreasing the value of the transmission interval increases the transmission frequency.

45. The method of claim 44, further comprising increasing the transmission interval to the initial value after a timeout period from when the control circuit detects that the continued user interaction of the user interface has stopped.

46. A method comprising:
receiving an indication of a user interaction;
starting a usage timer in response to receiving the indication of the user interaction;
periodically transmitting command messages at a transmission frequency in response to a continued user interaction, each of the command messages comprising a respective command for adjusting to a respective lighting level, wherein the continued user interaction occurs when the usage timer exceeds a first usage threshold;
determining that there is excessive usage of the user interface when the usage timer exceeds a second usage threshold; and
decreasing the transmission frequency at which command messages are periodically transmitted after the usage timer exceeds the first usage threshold and the excessive usage of the user interface is determined.

47. The method claim 46, wherein each of the command messages are periodically transmitted at a transmission interval that is dependent on the transmission frequency.

48. The method of claim 47, further comprising determining the respective lighting level of the respective command of each of the commands messages in response to an amount of change in an angular position of a rotation portion during the transmission interval.

49. The method of claim 47, further comprising:
determining a desired amount of change in a lighting level based on the determined amount of change in the angular position of a rotation portion, and
determining that there is excessive usage of the rotation portion when the change in the lighting level exceeds a lighting level change threshold and the usage timer exceeds the usage threshold.

50. A method comprising:
receiving an indication of a user interaction;
starting a usage timer in response to receiving the indication of the user interaction;
periodically transmitting command messages at a transmission interval in response to a continued user interaction, each of the command messages comprising a respective command for adjusting to a respective lighting level; and
stopping the periodic transmission of the command messages in response to the usage timer exceeding a usage threshold.

51. The method of claim 50, further comprising detecting that the continued user interaction of the user interface has stopped, and transmit a final command message based on detecting that the continued user interaction of the user interface has stopped, wherein the final command message includes a command for adjusting to the lighting level based on a final position of the user interaction.

* * * * *